US012807166B2

United States Patent
Yamamoto

(12) United States Patent
(10) Patent No.: US 12,807,166 B2
(45) Date of Patent: Nov. 24, 2026

(54) VEHICLE STATE QUANTITY ESTIMATION DEVICE

(71) Applicant: AISIN CORPORATION, Kariya (JP)

(72) Inventor: Akihito Yamamoto, Kariya (JP)

(73) Assignee: AISIN CORPORATION, Kariya (JP)

( * ) Notice: Subject to any disclaimer, the term of this patent is extended or adjusted under 35 U.S.C. 154(b) by 373 days.

(21) Appl. No.: 18/036,300

(22) PCT Filed: Jan. 25, 2022

(86) PCT No.: PCT/JP2022/002726
§ 371 (c)(1),
(2) Date: May 10, 2023

(87) PCT Pub. No.: WO2022/168683
PCT Pub. Date: Aug. 11, 2022

(65) Prior Publication Data

US 2024/0001936 A1 Jan. 4, 2024

(30) Foreign Application Priority Data

Feb. 3, 2021 (JP) ................................ 2021-015711
Feb. 3, 2021 (JP) ................................ 2021-015857
Jun. 4, 2021 (JP) ................................ 2021-094603

(51) Int. Cl.
*B60W 40/107* (2012.01)
*G06N 3/045* (2023.01)

(52) U.S. Cl.
CPC ........... *B60W 40/107* (2013.01); *G06N 3/045* (2023.01); *B60W 2520/14* (2013.01); *B60W 2520/28* (2013.01); *B60W 2540/18* (2013.01)

(58) Field of Classification Search
CPC ........... B60W 40/107; B60W 2520/14; B60W 2520/28; B60W 2540/18; G06N 3/045;
(Continued)

(56) References Cited

U.S. PATENT DOCUMENTS

2016/0176259 A1 6/2016 Yamamoto et al.

FOREIGN PATENT DOCUMENTS

CN 110712490 A 1/2020
EP 3219564 A1 9/2017
(Continued)

OTHER PUBLICATIONS

WO2015098217A1 Translate (Year: 2015).*
(Continued)

*Primary Examiner* — Tara Schimpf
(74) *Attorney, Agent, or Firm* — Sughrue Mion, PLLC

(57) ABSTRACT

A vehicle state quantity estimation device according to an embodiment includes a data acquisition unit and a vehicle state estimation unit. The data acquisition unit acquires first data that is data about a velocity of a vehicle. The vehicle state estimation unit estimates either or both of a relative velocity and a vehicle body velocity according to the first data acquired by the data acquisition unit by using a neural network trained to estimate either or both of the relative velocity and the vehicle body velocity according to input of the first data, the relative velocity being a relative velocity of a tire-wheel assembly with respect to a vehicle body of the vehicle in a vertical direction of the vehicle, and the vehicle body velocity being a velocity of the vehicle body in the vertical direction.

5 Claims, 15 Drawing Sheets

(58) Field of Classification Search
CPC ... G06N 3/0442; B60T 2250/04; B60T 8/172; B60G 17/0182; B60G 2400/0523; B60G 2400/10; B60G 2400/102; B60G 2400/104; B60G 2400/106; B60G 2400/202; B60G 2400/204; B60G 2400/208; B60G 2400/41; B60G 2500/10; B60G 2600/1878; B60G 2800/70
See application file for complete search history.

(56) References Cited

FOREIGN PATENT DOCUMENTS

| | | | | |
|---|---|---|---|---|
| JP | 6-48139 | A | 2/1994 | |
| JP | 10-000913 | A | 1/1998 | |
| JP | 2007-223494 | A | 9/2007 | |
| JP | 2016-117326 | A | 6/2016 | |
| JP | 2024078933 | A | 6/2024 | |
| WO | 2013/133059 | A1 | 9/2013 | |
| WO | WO-2015098217 | A1 * | 7/2015 | ........... B60G 17/015 |

OTHER PUBLICATIONS

Communication dated Aug. 20, 2024 issued by the European Patent Office in application No. 22749557.9.
Gyuwon Kim, et al., “Deep Learning-Based Estimation of the Unknown Road Profile and State Variables for the Vehicle Suspension System”, IEEE Access, vol. 9, 2021, pp. 13878-13890.
Eldar Šabanovič, et al., “Feasibility of a Neural Network-Based Virtual Sensor for Vehicle Unsprung Mass Relative Velocity Estimation”, Sensors, vol. 21, No. 7139, 2021, pp. 1-16 (17 pages total).
Yanqing Liu et al . . . “Body Attitude State Estimation Using Wheel Rolling Speed Variations”, JSAE Annual Congress Proceedings (Spring), May 20-22, 2015, pp. 1578-1582.
Hironobu Kikuchi et al., “Practical Applications of Dynamic Body Motion Control System without Vertical Accelerometer”, May 23, 2016, 19 pgs.
International Search Report for PCT/JP2022/002726 dated, Mar. 22, 2022 (PCT/ISA/210).

* cited by examiner

VEHICLE STATE QUANTITY ESTIMATION DEVICE

CROSS REFERENCE TO RELATED APPLICATIONS

This application is a National Stage of International Application No. PCT/JP2022/002726 filed Jan. 25, 2022, claiming priority based on Japanese Patent Application No. 2021-015857 filed Feb. 3, 2021, Japanese Patent Application No. 2021-015711 filed Feb. 3, 2021, and Japanese Patent Application No. 2021-094603 filed Jun. 4, 2021, the entire contents of which are incorporated herein by reference.

TECHNICAL FIELD

Embodiments of the present disclosure relate to vehicle state quantity estimation devices.

BACKGROUND ART

Conventionally, a technique is known in which the relative velocity of each tire-wheel assembly with respect to the vehicle body in the vertical direction of a vehicle (so-called stroke velocity) and the vehicle body velocity (so-called sprung mass velocity) that is the velocity of the vehicle body in the vertical direction of the vehicle are estimated as the vehicle state and the damping force of a shock absorber of each suspension is controlled based on the estimated relative velocity and vehicle body velocity.

RELATED ART DOCUMENTS

Patent Documents

Patent Document 1: Japanese Unexamined Patent Application Publication No. H10-913 (JP H10-913 A)

Patent Document 2: Japanese Unexamined Patent Application Publication No. 2016-117326 (JP 2016-117326 A)

SUMMARY OF THE DISCLOSURE

Problem to be Solved by Various Aspects of the Disclosure

In this type of technique, it would be beneficial if the accuracy of estimation of the vehicle state could be improved.

Means for Solving the Problem

A vehicle state quantity estimation device according to an embodiment of the present disclosure includes: a data acquisition unit that acquires first data that is data about a velocity of a vehicle; and a vehicle state estimation unit that estimates either or both of a relative velocity and a vehicle body velocity according to the first data acquired by the data acquisition unit by using a first neural network trained to estimate either or both of the relative velocity and the vehicle body velocity according to input of the first data, the relative velocity being a relative velocity of a tire-wheel assembly of the vehicle with respect to a vehicle body of the vehicle in a vertical direction of the vehicle, and the vehicle body velocity being a velocity of the vehicle body in the vertical direction.

With such a configuration, the vehicle state estimation unit estimates either or both of the relative velocity, which is the relative velocity of the tire-wheel assembly with respect to the vehicle body of the vehicle in the vertical direction of the vehicle, and the vehicle body velocity, which is the velocity of the vehicle body in the vertical direction, according to the first data acquired by the data acquisition unit by using the first neural network trained to estimate either or both of the relative velocity and the vehicle body velocity according to input of the first data. Therefore, the accuracy of estimation of the vehicle state (either or both of the relative velocity and the vehicle body velocity) can be improved.

In the vehicle state quantity estimation device, for example, the first data is wheel speed data indicating a rotational speed of the tire-wheel assembly.

With such a configuration, the vehicle state estimation unit estimates either or both of the relative velocity, which is the relative velocity of the tire-wheel assembly with respect to the vehicle body of the vehicle in the vertical direction of the vehicle, and the vehicle body velocity, which is the velocity of the vehicle body in the vertical direction, according to the wheel speed data acquired by the data acquisition unit by using the first neural network trained to estimate either or both of the relative velocity and the vehicle body velocity according to input of the wheel speed data. Therefore, the accuracy of estimation of the vehicle state (either or both of the relative velocity and the vehicle body velocity) can be improved.

In the vehicle state quantity estimation device, for example, the data acquisition unit acquires yaw rate data indicating a yaw rate of the vehicle, the first neural network has been trained to estimate either or both of the relative velocity and the vehicle body velocity according to input of the wheel speed data and the yaw rate data, and the vehicle state estimation unit uses the first neural network to estimate either or both of the relative velocity and the vehicle body velocity according to the wheel speed data and the yaw rate data both acquired by the data acquisition unit.

With such a configuration, the accuracy of estimation of the vehicle state (either or both of the relative velocity and the vehicle body velocity) can further be improved.

In the vehicle state quantity estimation device, for example, the vehicle includes a shock absorber interposed between the vehicle body and the tire-wheel assembly and capable of changing a damping force according to an input current, the data acquisition unit acquires current value data indicating a value of the current, the first neural network has been trained to estimate either or both of the relative velocity and the vehicle body velocity according to input of the wheel speed data and the current value data, and the vehicle state estimation unit uses the first neural network to estimate either or both of the relative velocity and the vehicle body velocity according to the wheel speed data and the current value data both acquired by the data acquisition unit.

With such a configuration, the accuracy of estimation of the vehicle state (either or both of the relative velocity and the vehicle body velocity) can further be improved.

In the vehicle state quantity estimation device, for example, the data acquisition unit acquires steering angle data indicating a steering angle of the vehicle, the first neural network has been trained to estimate either or both of the relative velocity and the vehicle body velocity according to input of the wheel speed data and the steering angle data, and the vehicle state estimation unit uses the first neural network to estimate either or both of the relative velocity and the vehicle body velocity according to the wheel speed data and the steering angle data both acquired by the data acquisition unit.

With such a configuration, the accuracy of estimation of the vehicle state (either or both of the relative velocity and the vehicle body velocity) can further be improved.

In the vehicle state quantity estimation device, the first data is acceleration data indicating an acceleration of the vehicle, the first neural network has been trained to estimate the relative velocity, and the vehicle state estimation unit uses the first neural network to estimate the relative velocity according to the acceleration data acquired by the data acquisition unit.

With such a configuration, the vehicle state estimation unit estimates the relative velocity according to the acceleration data acquired by the data acquisition unit by using the first neural network trained to estimate the relative velocity of the tire-wheel assembly of the vehicle with respect to the vehicle body of the vehicle in the vertical direction of the vehicle according to input of the acceleration data. Therefore, the accuracy of estimation of the relative velocity of the tire-wheel assembly with respect to the vehicle body can be improved.

In the vehicle state quantity estimation device, for example, the data acquisition unit acquires yaw rate data indicating a yaw rate of the vehicle, the first neural network has been trained to estimate the relative velocity according to input of the acceleration data and the yaw rate data, and the vehicle state estimation unit uses the first neural network to estimate the relative velocity according to the acceleration data and the yaw rate data both acquired by the data acquisition unit.

With such a configuration, the accuracy of estimation of the relative velocity of the tire-wheel assembly with respect to the vehicle body can further be improved.

In the vehicle state quantity estimation device, for example, the vehicle includes a shock absorber interposed between the vehicle body and the tire-wheel assembly and capable of changing a damping force according to an input current, the data acquisition unit acquires current value data indicating a value of the current, the first neural network has been trained to estimate the relative velocity according to input of the acceleration data and the current value data, and the vehicle state estimation unit uses the first neural network to estimate the relative velocity according to the acceleration data and the current value data both acquired by the data acquisition unit.

With such a configuration, the accuracy of estimation of the relative velocity of the tire-wheel assembly with respect to the vehicle body can further be improved.

In the vehicle state quantity estimation device, for example, the data acquisition unit acquires steering angle data indicating a steering angle of the vehicle, the first neural network has been trained to estimate the relative velocity according to input of the acceleration data and the steering angle data, and the vehicle state estimation unit uses the first neural network to estimate the relative velocity according to the acceleration data and the steering angle data both acquired by the data acquisition unit.

With such a configuration, the accuracy of estimation of the relative velocity of the tire-wheel assembly with respect to the vehicle body can further be improved.

In the vehicle state quantity estimation device, for example, the data acquisition unit acquires wheel speed data indicating a rotational speed of the tire-wheel assembly, the first neural network has been trained to estimate the relative velocity according to input of the acceleration data and the wheel speed data, and the vehicle state estimation unit uses the first neural network to estimate the relative velocity according to the acceleration data and the wheel speed data both acquired by the data acquisition unit.

With such a configuration, the accuracy of estimation of the relative velocity of the tire-wheel assembly with respect to the vehicle body can further be improved.

In the vehicle state quantity estimation device, for example, the data acquisition unit includes: an acquisition unit that acquires, from an acceleration sensor provided at only a part of a plurality of acceleration detection target points located at different positions from each other in the vehicle, actual acceleration data indicating an actual acceleration that is an actual acceleration at the acceleration detection target point; and an estimation unit that estimates the actual accelerations at all of the plurality of acceleration detection target points according to input of the actual acceleration data by using a second neural network trained to estimate, according to input of the actual acceleration data, the actual acceleration at the acceleration detection target point detected by each of the acceleration sensors when the acceleration sensor is provided at all of the plurality of acceleration detection target points.

With such a configuration, the accuracy of the acceleration data can be improved, and the accuracy of estimation of the relative velocity of the tire-wheel assembly with respect to the vehicle body can further be improved.

In the vehicle state quantity estimation device, for example, the first neural network is a long short term memory (LSTM).

With such a configuration, the accuracy of estimation of the vehicle state (either or both of the relative velocity and the vehicle body velocity) can be improved.

A vehicle state acquisition device according to an embodiment of the present disclosure includes: an acquisition unit that acquires, from an acceleration sensor provided at only a part of a plurality of acceleration detection target points located at different positions from each other in a vehicle, actual acceleration data indicating an actual acceleration that is an actual acceleration at the acceleration detection target point; and an estimation unit that estimates the actual accelerations at all of the plurality of acceleration detection target points according to input of the actual acceleration data by using a neural network trained to estimate, according to input of the actual acceleration data, the actual acceleration at the acceleration detection target point detected by each of the acceleration sensors when the acceleration sensor is provided at all of the plurality of acceleration detection target points.

With such a configuration, the accuracy of estimation of the acceleration of the vehicle can be improved.

DESCRIPTION OF EMBODIMENTS

Embodiments will be described in detail below with reference to the drawings. The present disclosure is not limited by the embodiments. The following embodiments include like constituent elements. The like constituent elements are denoted by like signs, and repetitive description will be omitted.

First Embodiment

Figure 1:
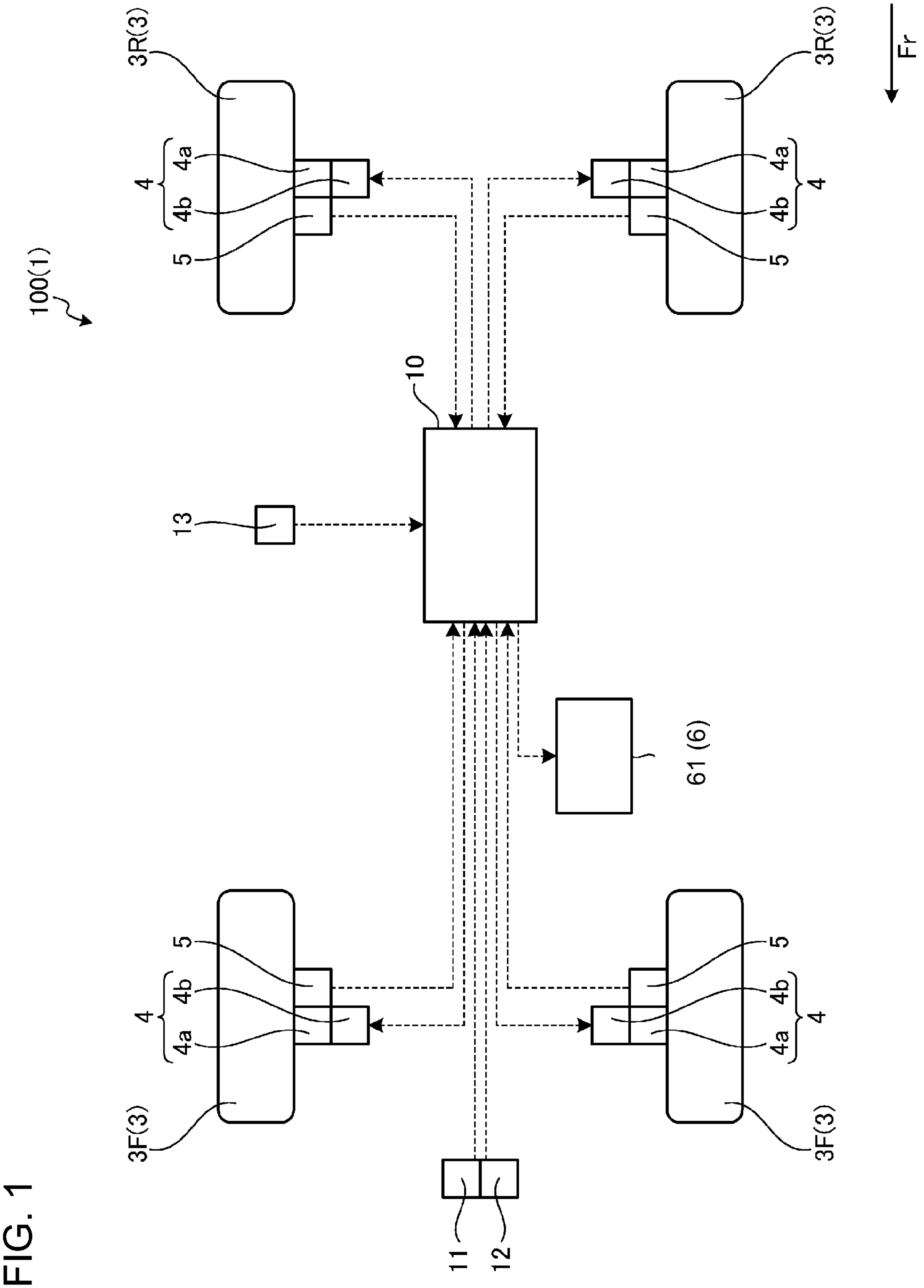
FIG. 1 is a schematic diagram showing a schematic configuration of an example of a vehicle according to a first embodiment.

FIG. 1 is a schematic diagram showing a schematic configuration of an example of a vehicle 1 according to a first embodiment. In the present embodiment, the vehicle 1 may be, for example, an automobile using an internal combustion engine (engine, not shown) as a driving source (internal combustion engine vehicle), an automobile using an electric motor (motor, not shown) as a driving source (battery electric vehicle, fuel cell electric vehicle, etc.), or an automobile using both of them as driving sources (hybrid electric vehicle). The vehicle 1 can be equipped with various speed change devices, and can be equipped with various devices (systems, parts, etc.) necessary to drive an internal combustion engine and an electric motor. The types, number, arrangement, etc. of devices related to driving of tire-wheel assemblies 3 in the vehicle 1 can be set in various manners. In the present embodiment, as an example, the vehicle 1 is a four-wheeler (four-wheeled vehicle) and has two right and left front tire-wheel assemblies 3F and two right and left rear tire-wheel assemblies 3R. The leftward direction in FIG. 1 is the forward direction (direction Fr) in the vehicle front-rear direction.

In the present embodiment, as an example, a vehicle control system 100 of the vehicle 1 includes a control device 10, a steering system 11, a steering angle sensor 12, a yaw rate sensor 13, a braking system 61, etc. The vehicle control system 100 further includes a suspension system 4, a rotation sensor 5, a braking device 6, etc. for each of the two front tire-wheel assemblies 3F, and further includes a suspension system 4, a rotation sensor 5, etc. for each of the two rear tire-wheel assemblies 3R. Although the vehicle 1 includes basic constituent elements of the vehicle 1 other than those shown in FIG. 1, only the configurations related to the vehicle control system 100 and the control related to the configurations will be described. The two front tire-wheel assemblies 3F and the two rear tire-wheel assemblies 3R will be collectively referred to as tire-wheel assemblies 3. The relative velocity of each tire-wheel assembly 3 of the vehicle 1 with respect to a vehicle body 2 of the vehicle 1 is also referred to as stroke velocity, the portion of the vehicle 1 located on the vehicle body 2 side with respect to the suspension systems 4 is also referred to as sprung mass, and the portion of the vehicle 1 located on the tire-wheel assembly 3 side with respect to the suspension systems 4 is also referred to as unsprung mass. In the following description, the relative velocity refers to the relative velocity of the tire-wheel assembly 3 with respect to the vehicle body 2 in the vertical direction of the vehicle 1 unless otherwise specified.

The control device 10 receives signals, data, etc. from each part of the vehicle control system 100, and controls each part of the vehicle control system 100 and performs various computations. In the present embodiment, the control device 10 is an example of the vehicle state quantity estimation device. The control device 10 is configured as a computer, and includes an arithmetic processing unit (a microcomputer, an electronic control unit (ECU), etc., not shown), a storage unit 10*d* (e.g., a read only memory (ROM), a random access memory (RAM), and a flash memory), etc., see FIG. 3), etc. The arithmetic processing unit can read a program stored (installed) in the nonvolatile storage unit 10*d* (e.g., a ROM, a flash memory, etc.) and perform computations according to the program to function (operate) as each unit shown in FIG. 3. Data (tables (data groups), functions, etc.) to be used in various computations related to control, computation results (including values during computations), etc. may also be stored in the storage unit 10*d*. A vehicle state estimation network 121 is stored in the storage unit 10*d*. The vehicle state estimation network 121 will be described in detail later.

The steering system 11 includes, for example, a steering wheel, and steers (turns) the two front tire-wheel assemblies 3F. The steering angle sensor 12 detects the steering angle (steering angle, turning angle, steered angle) of the front tire-wheel assemblies 3F, and outputs steering angle data indicating the detected steering angle.

The yaw rate sensor 13 detects the yaw rate of the vehicle 1 (vehicle body 2), and outputs yaw rate information indicating the detected yaw rate.

Figure 2:
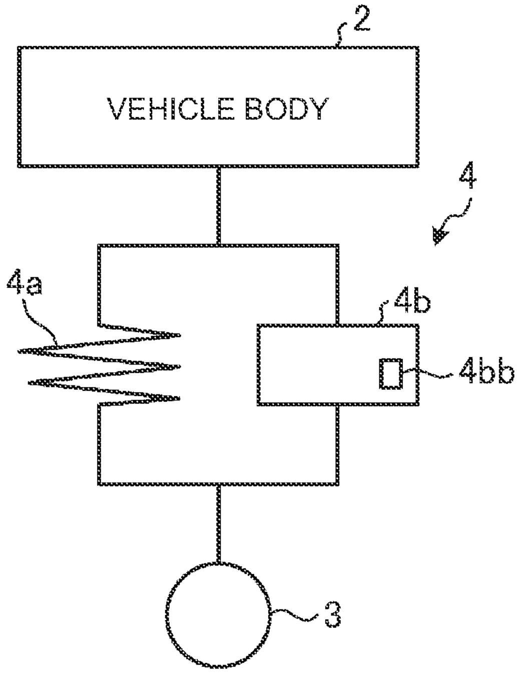
FIG. 2 is a schematic diagram showing a schematic configuration of an example of a suspension system in the vehicle according to the first embodiment.

FIG. 2 is a schematic diagram showing a schematic configuration of an example of the suspension system 4 in the vehicle according to the first embodiment. As shown in FIG. 2, the suspension system 4 is interposed between the tire-wheel assembly 3 and the vehicle body 2, and reduces transmission of vibrations and impacts from the road surface to the vehicle body. The suspension system 4 has a coil spring 4*a* and a shock absorber 4*b*. The shock absorber 4*b* can electrically control (adjust) the damping force (damping characteristic). Specifically, the shock absorber 4*b* has an actuator 4*bb* that operates based on an input current. The actuator 4*bb* can change the degree of opening of an orifice provided in a piston of the shock absorber 4*b*, and can change the degree of opening between a valve disc and a valve seat. The amount of lubricating oil flowing between two oil chambers separated by the piston in the shock absorber 4*b* is thus controlled to adjust the damping force of the shock absorber 4*b*. The suspension system 4 is provided for each of the four tire-wheel assemblies 3 (two front tire-wheel assemblies 3F and two rear tire-wheel assemblies 3R), and the control device 10 can control the damping force on each of the four tire-wheel assemblies 3. The control device 10 can control the four tire-wheel assemblies 3 so that the damping forces on the tire-wheel assemblies 3 are different from each other. Specifically, a damping coefficient C is controlled in order to control the damping force of the shock absorber 4*b* (=damping coefficient C×stroke velocity V). More specifically, the damping coefficient C is controlled by controlling the current that is applied to the actuator 4*bb* of the shock absorber 4*b*. The shock absorber 4*b* is also called a damper.

Each rotation sensor 5 can output a signal according to the rotational speed (angular velocity, number of rotations, rotation state) of a corresponding one of the four tire-wheel assemblies 3. The control device 10 can calculate the speed of the vehicle 1 from the detection results of the rotation sensors 5. Rotation sensors (not shown) for detecting rotation of a crankshaft, axles, etc. may be provided in addition to the rotation sensors 5 for the tire-wheel assemblies 3, and the control device 10 may acquire the speed of the vehicle 1 from the detection results of these rotation sensors.

The above configuration of the vehicle control system 100 is merely an example, and can be implemented in various modified forms. Well-known devices can be used as individual devices that form the vehicle control system 100. Each configuration of the vehicle control system 100 can also be used for other configurations.

Figure 3:
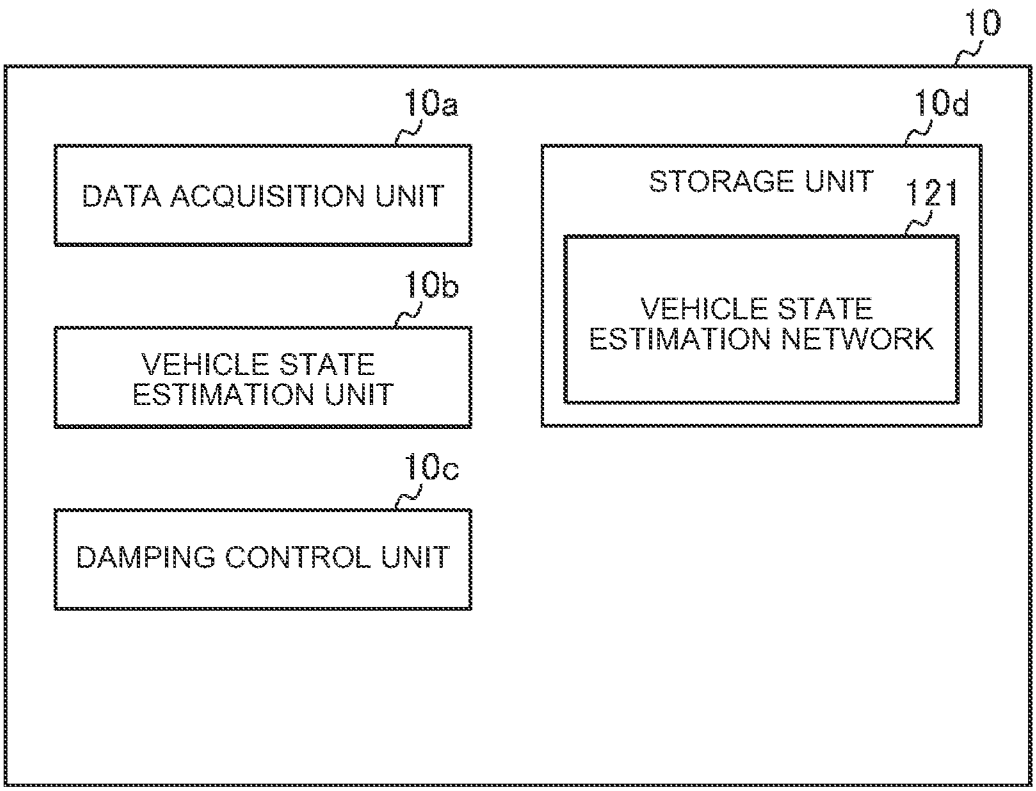
FIG. 3 is a functional block diagram of a control device of the example of the vehicle according to the first embodiment.

In the present embodiment, as an example, the control device 10 can function (operate) as a data acquisition unit 10*a*, a vehicle state estimation unit 10*b*, a damping control unit 10*c*, etc. shown in FIG. 3 by cooperation of hardware and software (program). That is, as an example, the program may include modules corresponding to the blocks shown in FIG. 3 except the storage unit 10*d*.

The data acquisition unit 10*a* acquires wheel speed data indicating the rotational speed of the tire-wheel assembly 3 from each rotation sensor 5. The data acquisition unit 10*a* also acquires yaw rate data indicating the yaw rate of the vehicle 1 from the yaw rate sensor 13. The data acquisition unit 10*a* also acquires from the damping control unit 10*c* current value data indicating the values of the currents that are applied to the shock absorbers 4*b*. The data acquisition unit 10*a* also acquires steering angle data indicating the steering angle of the vehicle 1 from the steering angle sensor 12.

As an example, the vehicle state estimation unit 10*b* receives predetermined data acquired by the data acquisition unit 10*a* (hereinafter also referred to as input data). The vehicle state estimation unit 10*b* estimates the relative velocity according to the input data by using the vehicle state estimation network 121. The input data includes at least the wheel speed data. The input data may include at least one of the following in addition to the wheel speed data: the yaw rate data, the current value data, and the steering angle data. The input data is not limited to the above. The wheel speed data is an example of the first data.

The vehicle state estimation network 121 is configured as a recurrent neutral network (RNN) trained in advance to estimate either or both (for example, both) of the following according to input of the input data: the relative velocity of the tire-wheel assembly 3 of the vehicle 1 with respect to the vehicle body 2 of the vehicle 1 in the vertical direction of the vehicle 1, and the vehicle body velocity that is the velocity of the vehicle body 2 in the vertical direction of the vehicle 1. For the training of the vehicle state estimation network 121, the input data is the above input data acquired by the data acquisition unit 10*a*, and the output data as training data is, for example, either or both (for example, both) of the following: an actual measured value (true value) of the relative velocity of the tire-wheel assembly 3 of the vehicle 1 with respect to the vehicle body 2 of the vehicle 1 in the vertical direction of the vehicle 1 measured by a relative velocity sensor (not shown), and an actual measured value of the velocity of the vehicle body 2 in the vertical direction of the vehicle 1 measured by a velocity sensor (not shown). The vehicle state estimation network 121 may be configured as a recurrent neural network (RNN) trained in advance to estimate either the relative velocity described above or the vehicle body velocity described above.

Figure 4:
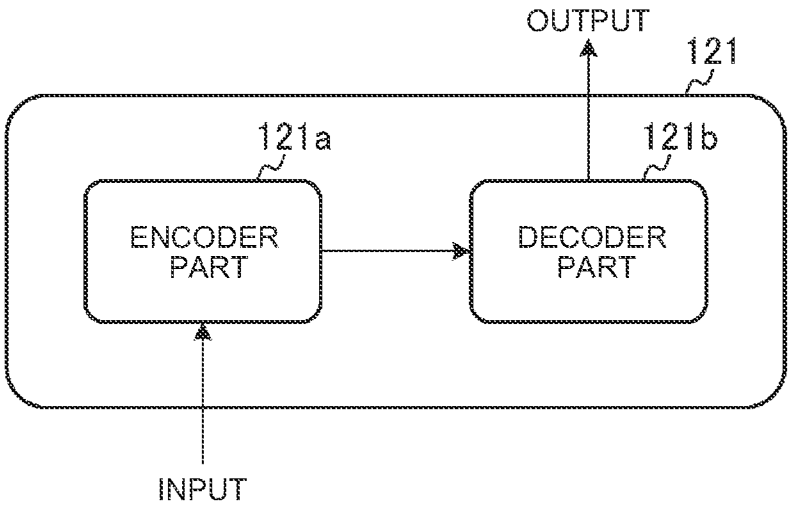
FIG. 4 is an exemplary schematic block diagram showing the configuration of a vehicle state estimation network according to the first embodiment.
Figure 5:
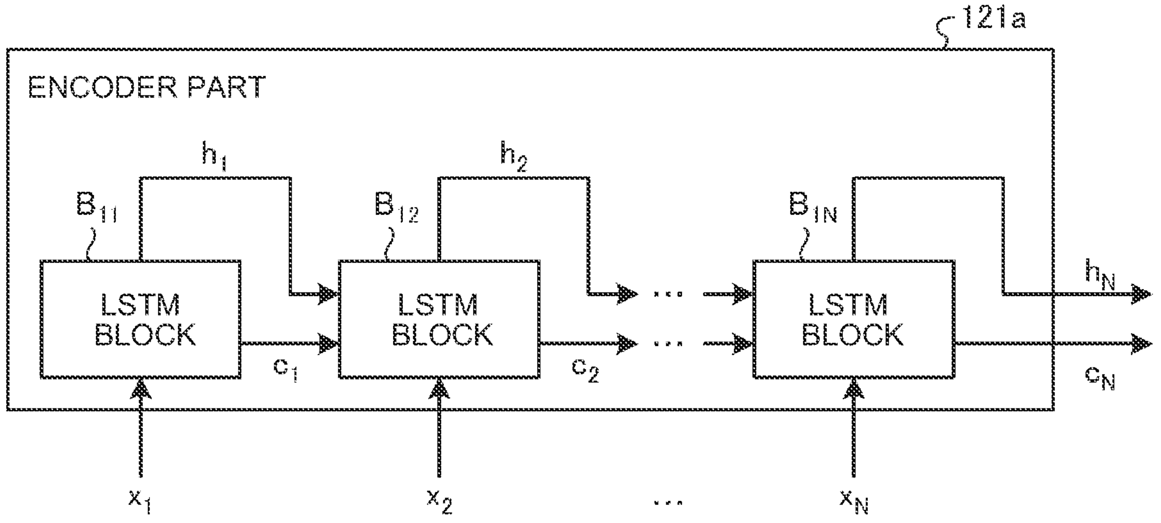
FIG. 5 is an exemplary schematic block diagram showing an example of the configuration of an encoder part of the vehicle state estimation network according to the first embodiment.
Figure 6:
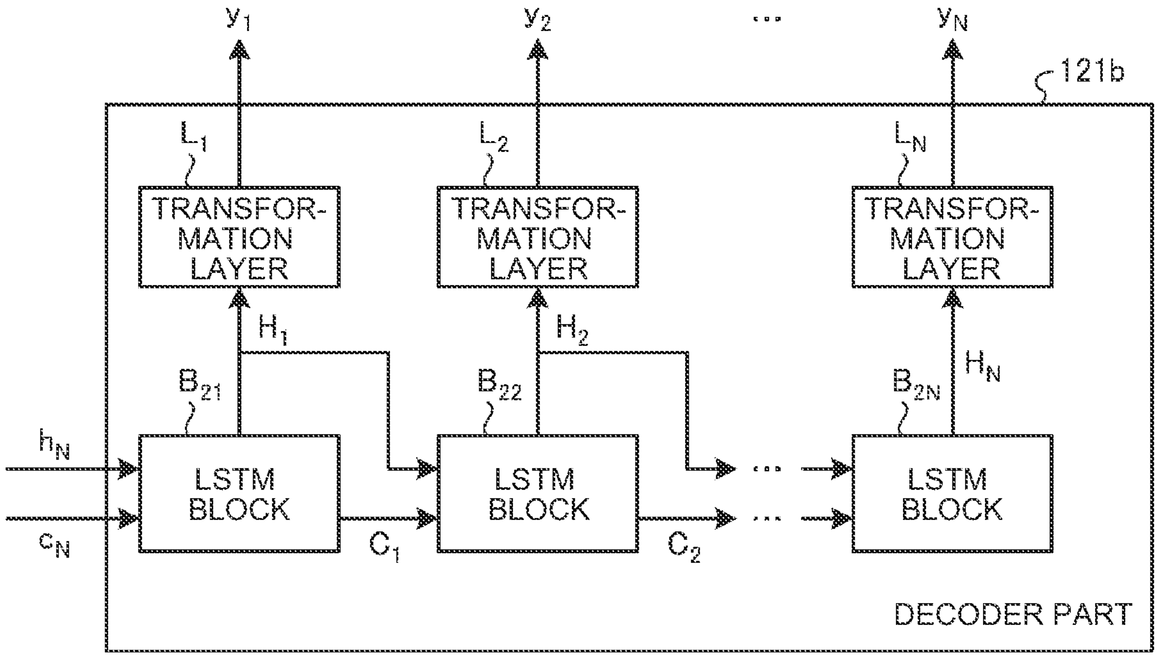
FIG. 6 is an exemplary schematic block diagram showing an example of the configuration of a decoder part of the vehicle state estimation network according to the first embodiment.
Figure 7:
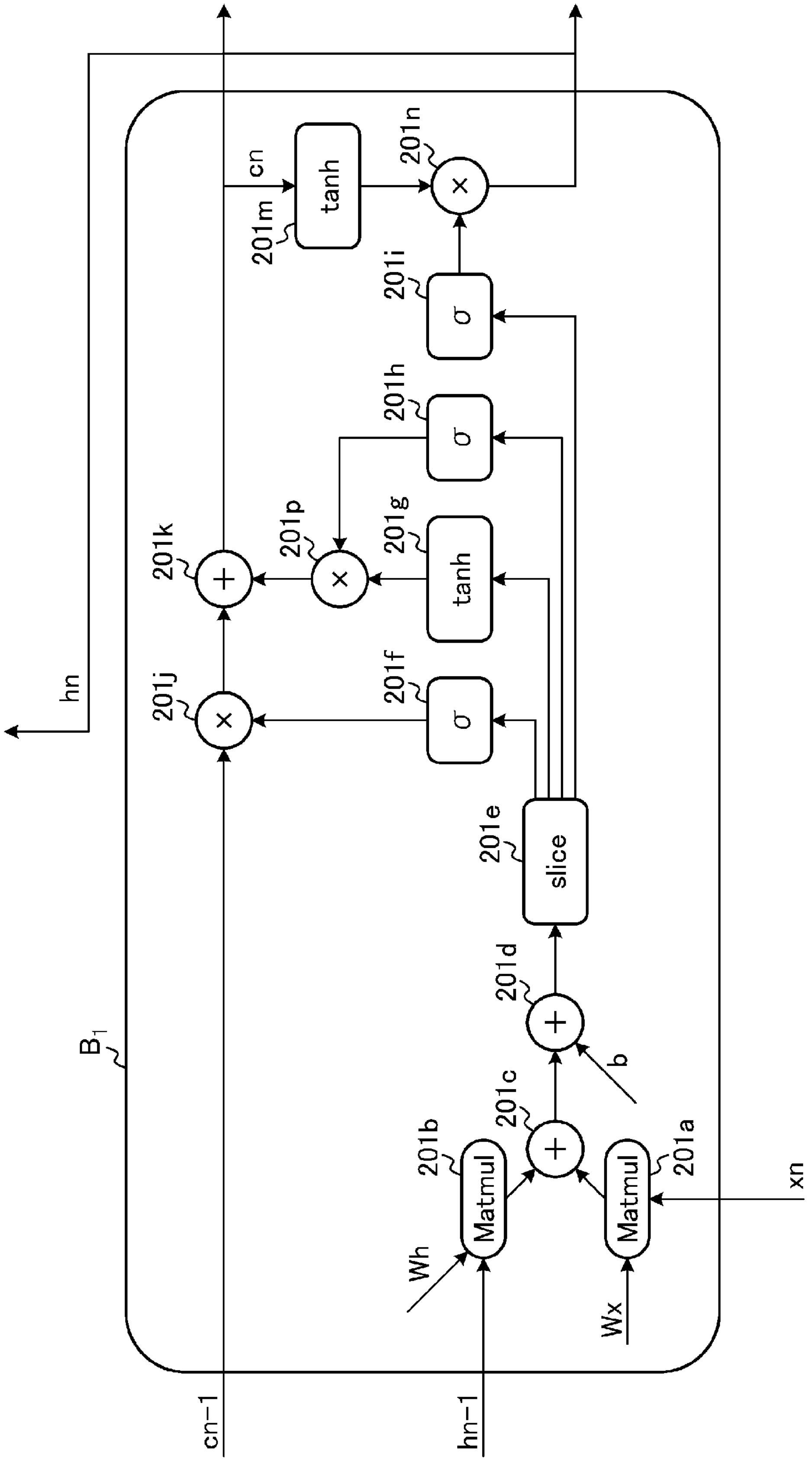
FIG. 7 is an exemplary schematic block diagram showing an example of the configuration of an LSTM block of the vehicle state estimation network according to the first embodiment.

FIG. 4 is an exemplary schematic block diagram showing the configuration of the vehicle state estimation network 121 according to the first embodiment. FIG. 5 is an exemplary schematic block diagram showing an example of the configuration of an encoder part 121*a* of the vehicle state estimation network 121 according to the first embodiment. FIG. 6 is an exemplary schematic block diagram showing an example of the configuration of a decoder part 121*b* of the vehicle state estimation network 121 according to the first embodiment. FIG. 7 is an exemplary schematic block diagram showing an example of the configuration of an LSTM block of the vehicle state estimation network 121 according to the first embodiment.

As shown in FIG. 4, the vehicle state estimation network 121 according to the embodiment is configured as a sequence to sequence (Seg2Seq) model. More specifically, the vehicle state estimation network 121 includes the encoder part 121*a* that receives input of input data and performs encoding, and the decoder part 121*b* that performs decoding based on the encoder results from the encoder part 121*a* and outputs the decoded data (hereinafter also referred to output data).

In the example shown in FIG. 4, input data $x_1$, $x_2$, $x_3$, $x_4$, $x_5$, . . . that is input at predetermined time steps is illustrated as inputs to the encoder part 121*a*.

On the other hand, in the example shown in FIG. 5, output data $y_1$, $y_2$, $y_3$, $y_4$, $y_5$, . . . that is output at predetermined time steps is illustrated as outputs from the decoder part 121*b*.

The vehicle state estimation network 121 according to the embodiment has been trained in advance by machine learning to receive input of time-series data such as the above input data $x_1$, $x_2$, $x_3$, $x_4$, $x_5$, . . . and output time-series data indicating an output at each time step such as the above output data $y_1$, $y_2$, $y_3$, $y_4$, $y_5$, . . . .

Hereinafter, specific configurations of the encoder part 121*a* and the decoder part 121*b* of the vehicle state estimation network 121 according to the first embodiment will be described with reference to FIGS. 5 to 7. However, the configurations shown in FIGS. 5 and 6 that will be described below are merely an example.

As shown in FIG. 5, the encoder part 121*a* according to the first embodiment is configured based on a long short-term memory (LSTM). That is, the encoder part 121*a* is composed of a plurality of (e.g., N) LSTM blocks $B_{11}$, $B_{12}$, . . . , $B_{1N}$. The LSTM blocks $B_{11}$, $B_{12}$, . . . , $B_{1N}$ are hereinafter sometimes collectively referred to as LSTM blocks $B_1$. The configuration of each LSTM block $B_{11}$, $B_{12}$, . . . , $B_{1N}$ is a typical configuration with an input gate, an output gate, and a forget gate. As an example, as shown in FIG. 7, the LSTM block $B_1$ includes matrix product computation parts 201*a*, 201*b*, addition parts 201*c*, 201*d*, and 201*k*, multiplication parts 201*j*, 201*p*, a slice part 201*e*, sigmoid function parts 201*f*, 201*h*, and 201*i*, and a tan h part 201*g*. Computations are performed by these parts. The addition parts 201*c*, 201*d*, and 201*k* and the multiplication parts 201*j*, 201*p* are computations for each matrix element (Hadamard computations). Wh in FIG. 7 is the weight to be given to a hidden layer, and Wx is the weight to be given to an input value.

The LSTM block $B_{11}$ receives input of input data $x_1$ and passes data hi indicating an output according to the input and data ci indicating a memory cell to the subsequent LSTM block $B_{12}$. The LSTM block $B_{12}$ and the subsequent LSTM blocks also operate similarly, and the Nth LSTM block $B_{1N}$ receives input of data $x_N$ and passes data $h_N$ indicating an output according to the input and data $c_N$ indicating a memory cell to the outside of the encoder part 121*a* (i.e., the decoder part 121*b*).

As shown in FIG. 6, the decoder part 121*b* according to the embodiment is also configured based on an LSTM, like the encoder part 121*a* described above. That is, the decoder part 121*b* is also configured using a plurality of (e.g., N) LSTM blocks $B_{21}$, $B_{22}$, . . . , $B_{2N}$. The configuration of each LSTM block $B_{21}$, $B_{22}$, . . . , $B_{2N}$ is also a typical configuration with an input gate, an output gate, and a forget gate, like the LSTM blocks $B_{11}$, $B_{12}$, . . . , $B_{1N}$ described above.

However, unlike the encoder part 121*a* described above, the decoder part 121*b* includes a plurality of (e.g., N) transformation layers $L_1$, $L_2$, . . . , $L_N$ corresponding to the LSTM blocks $B_{21}$, $B_{22}$, . . . , $B_{2N}$. These transformation layers $L_1$, $L_2$, . . . , $L_N$ transform data $H_1$, $H_2$, . . . , $H_N$ indicating outputs from the LSTM blocks $B_{21}$, $B_{22}$, . . . , $B_{2N}$ to output data $y_1$, $y_2$, . . . , $y_N$ corresponding to sensor signals, respectively. In this example, output data y=(data H)×(weight W)+(bias b). The weight W and the bias b are obtained by machine learning.

The LSTM block $B_{21}$ receives input of the data $h_N$ and $c_N$ from the encoder part 121*a*, passes data $H_1$ indicating an output according to the input to the transformation layer $L_1$, and passes the data $H_1$ and data $C_1$ indicating a memory cell to the subsequent LSTM block $B_{22}$. The LSTM block $B_{22}$ and the subsequent LSTM blocks also operate similarly, and the Nth LSTM block $B_{2N}$ passes data $H_N$ indicating an output according to the input to the transformation layer $L_N$.

As described above, the vehicle state estimation network 121 according to the embodiment is configured based on a recurrent neural network configured by a Seg2Seq model based on an LSTM. More specifically, in the embodiment, the vehicle state estimation network 121 is configured as a result of training the weights W and biases b that should be set to the LSTM blocks $B_{11}$, $B_{12}$, . . . , $B_{1N}$, the LSTM blocks $B_{21}$, $B_{22}$, . . . , $B_{2N}$, and the transformation layers $L_1$, $L_2$, . . . , $L_N$ so that such a recurrent neural network as described above learns the correspondence between input data and output data. The vehicle state estimation network 121 is not limited to the above. For example, the vehicle state estimation network 121 may perform an Attention, an RNN, a bidirectional LSTM, a skip connection, Transformer, etc. in addition to the above.

Returning back to FIG. 3, the damping control unit 10*c* controls the damping force of the shock absorber 4*b* based on either or both (for example, both) of the relative velocity and the vehicle body velocity both estimated by the vehicle state estimation unit 10*b*. Specifically, the damping control unit 10*c* determines a current value to be input to the shock absorber 4*b*, and applies the current value to the shock absorber 4*b*.

Figure 8:
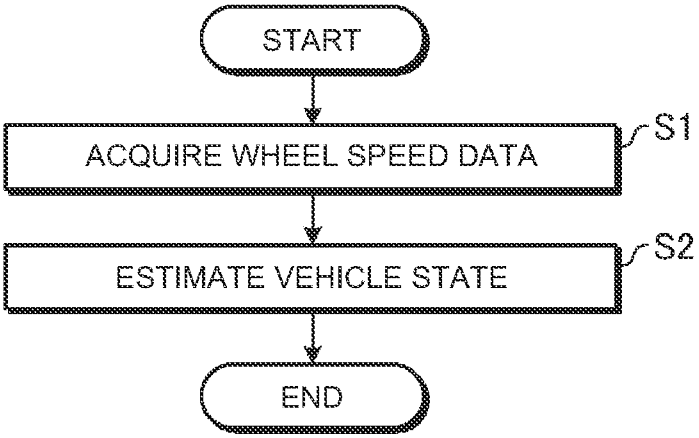
FIG. 8 is a flowchart showing an example of a vehicle state estimation method that is performed by the control device according to the first embodiment.

Next, an example of a vehicle state estimation method that is performed by the control device 10 will be described with reference to FIG. 8. FIG. 8 is a flowchart showing an example of the vehicle state estimation method that is performed by the control device 10 according to the first embodiment. Although FIG. 8 illustrates an example in which wheel speed data is used as input data, the input data is not limited to this.

As shown in FIG. 8, the data acquisition unit 10*a* first acquires wheel speed data (S1). Next, the vehicle state estimation unit 10*b* estimates either or both (for example, both) of the stroke velocity that is the relative velocity and the vehicle body velocity, based on the wheel speed data acquired by the data acquisition unit 10*a* and the vehicle state estimation network 121 (S2).

Figure 9:
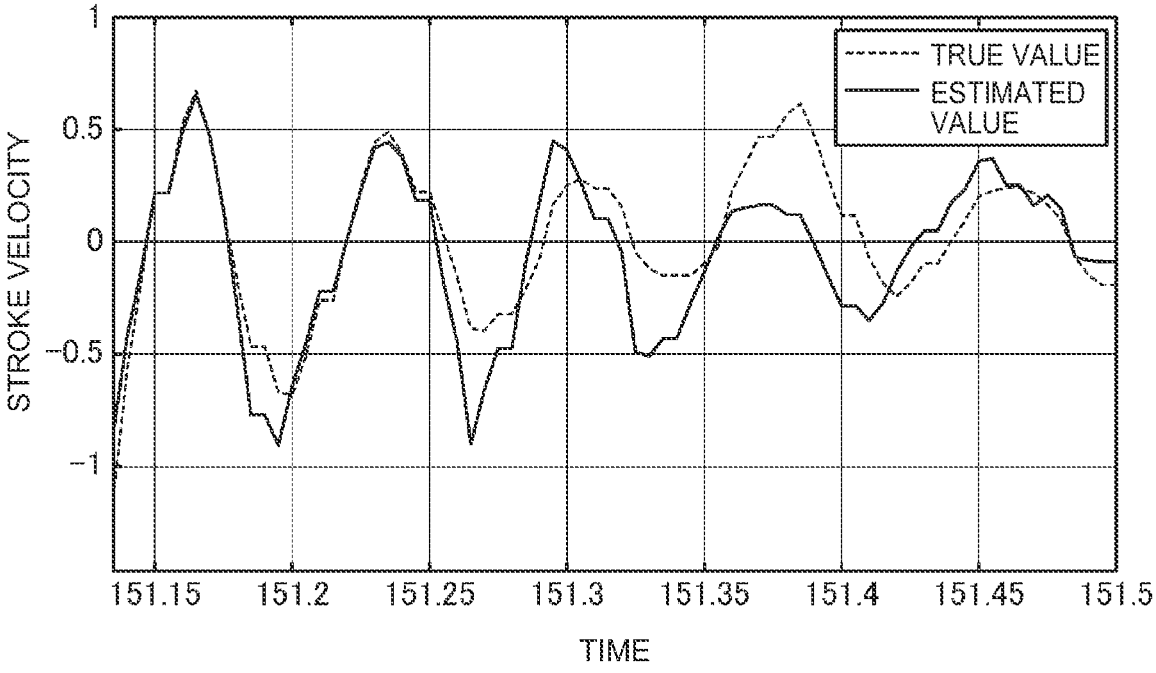
FIG. 9 is an exemplary schematic diagram showing an example of the stroke velocity estimation results obtained by a technique according to the first embodiment.

FIG. 9 is an exemplary schematic diagram showing an example of the stroke velocity estimation results obtained by the technique according to the first embodiment. FIG. 9 shows a stroke velocity (estimated value) estimated by the technique of the present embodiment and an actually measured stroke velocity (true value). In the present embodiment, it is possible to estimate a stroke velocity with a waveform of 10 Hz or more that is effective in controlling the damping force of the shock absorber 4*b*.

The control device 10 (damping control unit 10*c*) of the present embodiment controls the shock absorber 4*b* as follows. That is, the control device 10 controls the damping force of the shock absorber 4*b* based on the relative velocity and vehicle body velocity (sprung mass velocity) estimated using the vehicle state estimation network 121. More specifically, the control device 10 obtains a target damping force by performing known ride comfort control such as skyhook control based on the vehicle body velocity. The control device 10 then calculates a target damping coefficient of the shock absorber 4*b* based on the relative velocity estimated using the vehicle state estimation network 121 and the target damping force. Thereafter, the control device 10 applies a current corresponding to the target damping coefficient to the shock absorber 4*b*.

As described above, in the present embodiment, the control device 10 (vehicle state quantity estimation device) includes the data acquisition unit 10*a* and the vehicle state estimation unit 10*b* (vehicle state estimation unit). The data acquisition unit 10*a* acquires wheel speed data indicating the rotational speed of the tire-wheel assembly 3 of the vehicle 1. The vehicle state estimation unit 10*b* estimates either or both of the relative velocity (stroke velocity) and the vehicle body velocity according to the wheel speed data acquired by the data acquisition unit 10*a* by using the vehicle state estimation network 121 (neural network) trained to estimate either or both of the following according to input of the wheel speed data: the relative velocity of the tire-wheel assembly 3 of the vehicle 1 with respect to the vehicle body 2 of the vehicle 1 in the vertical direction of the vehicle 1, and the vehicle body velocity that is the velocity of the vehicle body 2 in the vertical direction of the vehicle 1.

With such a configuration, the vehicle state estimation unit 10*b* estimates either or both of the relative velocity (stroke velocity) and the vehicle body velocity according to the wheel speed data acquired by the data acquisition unit 10*a* by using the vehicle state estimation network 121 (neural network) trained to estimate either or both of the following according to input of the wheel speed data: the relative velocity of the tire-wheel assembly 3 of the vehicle 1 with respect to the vehicle body 2 of the vehicle 1 in the vertical direction of the vehicle 1, and the vehicle body velocity that is the velocity of the vehicle body 2. Therefore, the accuracy of estimation of the vehicle state (either or both of the relative velocity and the vehicle body velocity) can be improved. During training, the vehicle state estimation network 121 also learns an input delay (time lag) of input data due to communication latency as a feature. Therefore, in the vehicle state estimation network 121, it is not necessary to delete part of input data with a filter etc. in order to, for example, reduce the influence of the communication latency on estimation of the vehicle state. Therefore, the vehicle state estimation network 121 can estimate the vehicle state even at time steps corresponding to the resonance frequency of the unsprung mass.

In the present embodiment, the vehicle state estimation network 121 is an LSTM.

With such a configuration, the accuracy of estimation of the vehicle state (either or both of the relative velocity and the vehicle body velocity) can be improved.

In the present embodiment, the data acquisition unit 10*a* also acquires yaw rate data indicating the yaw rate of the vehicle 1. The vehicle state estimation network 121 has been trained to estimate either or both of the relative velocity and the vehicle body velocity according to input of the wheel speed data and the yaw rate data. The vehicle state estimation unit 10*b* uses the vehicle state estimation network 121 to estimate either or both of the relative velocity and the vehicle body velocity according to the wheel speed data and the yaw rate data both acquired by the data acquisition unit 10*a*.

With such a configuration, the accuracy of estimation of the vehicle state (either or both of the relative velocity and the vehicle body velocity) can further be improved.

In the present embodiment, the vehicle 1 includes the shock absorbers 4*b* that are interposed between the vehicle body 2 and the tire-wheel assemblies 3 and that can change the damping force according to the input current. The data acquisition unit 10*a* acquires current value data indicating values of currents. The vehicle state estimation network 121 has been trained to estimate either or both of the relative velocity and the vehicle body velocity according to input of the wheel speed data and the current value data. The vehicle state estimation unit 10*b* uses the vehicle state estimation network 121 to estimate either or both of the relative velocity and the vehicle body velocity according to the wheel speed data and the current value data both acquired by the data acquisition unit 10*a*.

With such a configuration, the accuracy of estimation of the vehicle state (either or both of the relative velocity and the vehicle body velocity) can further be improved.

In the present embodiment, the data acquisition unit 10*a* also acquires steering angle data indicating the steering angle of the vehicle 1. The vehicle state estimation network 121 has been trained to estimate either or both of the relative velocity and the vehicle body velocity according to input of the wheel speed data and the steering angle data. The vehicle state estimation unit 10*b* uses the vehicle state estimation network 121 to estimate either or both of the relative velocity and the vehicle body velocity according to the wheel speed data and the steering angle data both acquired by the data acquisition unit 10*a*.

With such a configuration, the accuracy of estimation of the vehicle state (either or both of the relative velocity and the vehicle body velocity) can further be improved.

Second Embodiment

Figure 10:
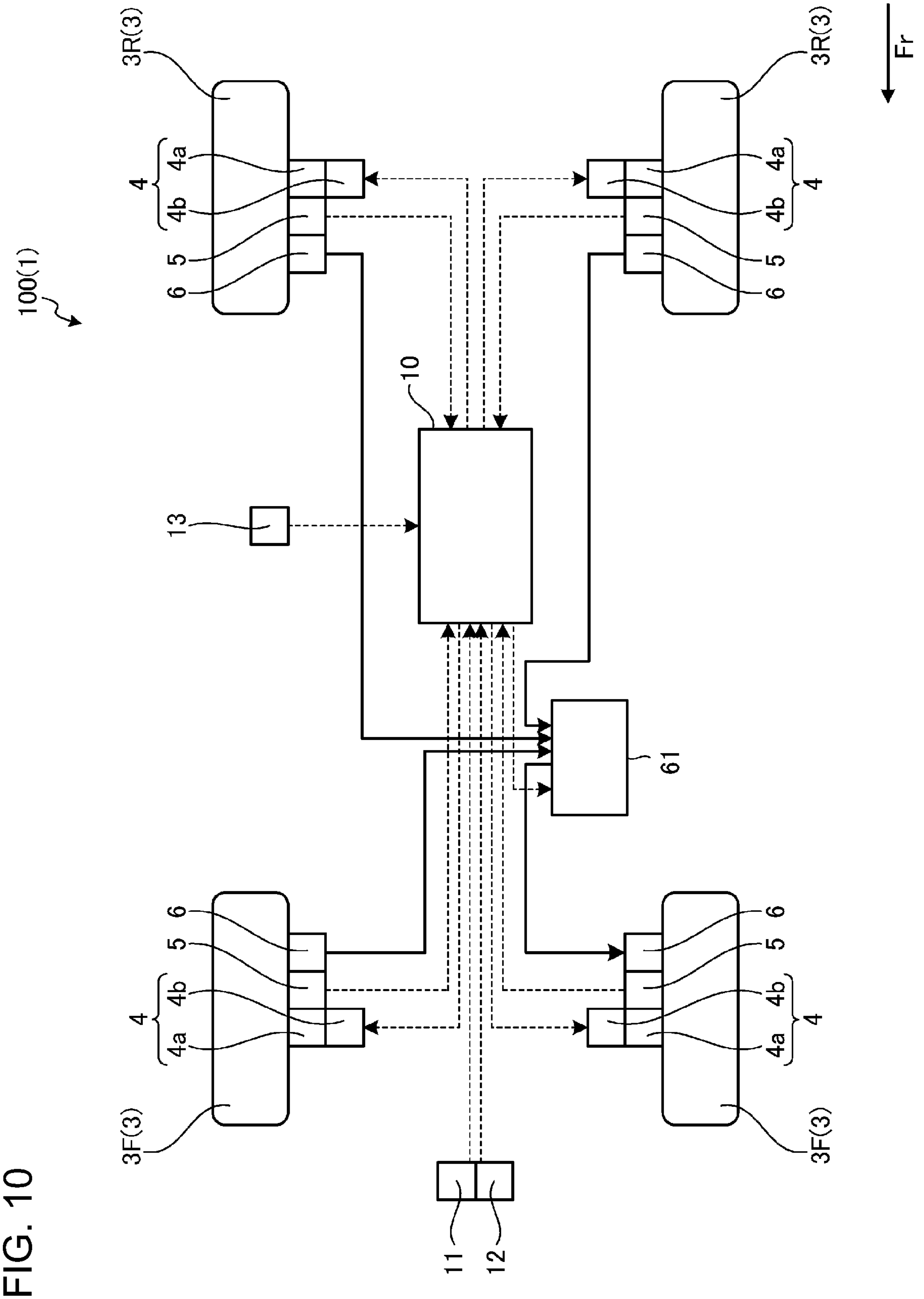
FIG. 10 is a schematic diagram showing a schematic configuration of an example of a vehicle according to a second embodiment.

FIG. 10 is a schematic diagram showing a schematic configuration of an example of the vehicle 1 according to a second embodiment. The present embodiment is different from the first embodiment in that acceleration sensors 6 are provided and in the process that is performed by the control device 10.

In the present embodiment, as an example, the vehicle control system 100 of the vehicle 1 includes a control device 10, a steering system 11, a steering angle sensor 12, a yaw rate sensor 13, a braking system 61, etc. The vehicle control system 100 further includes a suspension system 4, a rotation sensor 5, an acceleration sensor 6, etc. for each of the two front tire-wheel assemblies 3F, and further includes a suspension system 4, a rotation sensor 5, an acceleration sensor 6, etc. for each of the two rear tire-wheel assemblies 3R.

The acceleration sensors 6 are provided for the two front tire-wheel assemblies 3F and the two rear tire-wheel assemblies 3R. That is, the acceleration sensors 6 are provided on the vehicle body 2 so as to correspond to the four tire-wheel assemblies 3 and the four suspension systems 4. The acceleration sensors 6 detect the acceleration of the vehicle body 2 in the vehicle 1. More specifically, each acceleration sensor 6 is provided at an acceleration detection target point located directly above a corresponding one of the tire-wheel assemblies 3 (at a position directly above the wheel) in the vehicle body 2. That is, in the present embodiment, there are four acceleration detection target points. In the present embodiment, as an example, the acceleration sensor 6 can acquire an acceleration in the vertical direction of the vehicle 1, an acceleration in the front-rear direction (longitudinal direction) of the vehicle 1, and an acceleration in the width direction of the vehicle 1 (vehicle width direction, lateral direction, right-left direction).

Figure 11:
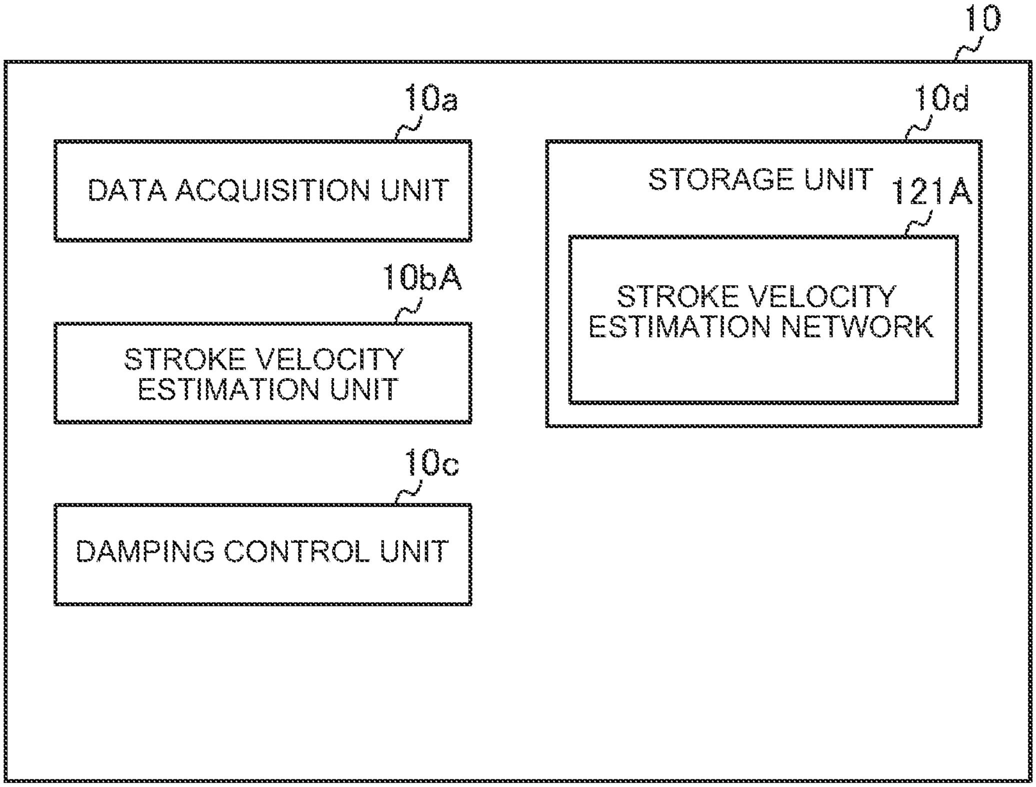
FIG. 11 is a functional block diagram of a control device of the example of the vehicle according to the second embodiment.

In the present embodiment, as an example, the control device 10 can function (operate) as a data acquisition unit 10*a*, a stroke velocity estimation unit 10*b*A, a damping control unit 10*c*, etc. shown in FIG. 11 by cooperation of hardware and software (program). That is, as an example, the program may include modules corresponding to the blocks shown in FIG. 11 except a storage unit 10*d*.

The data acquisition unit 10*a* acquires acceleration data indicating the acceleration of the vehicle 1 from each acceleration sensor 6. The acceleration of the vehicle 1 may be an acceleration in a desired direction. The acceleration of the vehicle 1 may be accelerations in a plurality of directions. That is, the acceleration of the vehicle 1 may be one or more of the acceleration in the front-rear direction of the vehicle 1, the acceleration in the right-left direction of the vehicle 1, and the acceleration in the vertical direction of the vehicle 1. The data acquisition unit 10*a* also acquires yaw rate data indicating the yaw rate of the vehicle 1 from the yaw rate sensor 13. The data acquisition unit 10*a* also acquires from the damping control unit 10*c* current value data indicating the values of the currents that are applied to the shock absorbers 4*b*. The data acquisition unit 10*a* also acquires steering angle data indicating the steering angle of the vehicle 1 from the steering angle sensor 12. The data acquisition unit 10*a* also acquires wheel speed data indicating the rotational speed of the tire-wheel assembly 3 from the rotation sensors 5. The acceleration data is an example of the first data that is data about the speed of the vehicle 1.

As an example, the stroke velocity estimation unit 10*b*A receives predetermined data acquired by the data acquisition unit 10*a* (hereinafter also referred to as input data). The stroke velocity estimation unit 10*b*A estimates the relative velocity speed according to the input data by using a stroke velocity estimation network 121A. The input data includes at least the acceleration data. The input data may include at least one of the following in addition to the acceleration data: the yaw rate data, the current value data, the steering angle data, and the wheel speed data. The input data is not limited to the above.

The stroke velocity estimation network 121A is configured as a recurrent neutral network (RNN) trained in advance to estimate, according to input of the input data, the relative velocity of the tire-wheel assembly 3 of the vehicle 1 with respect to the vehicle body 2 of the vehicle 1 in the vertical direction of the vehicle 1. For the training of the stroke velocity estimation network 121A, the input data is the above input data acquired by the data acquisition unit 10*a*, and the output data as training data is, for example, an actual measured value (true value) of the relative velocity of the tire-wheel assembly 3 of the vehicle 1 with respect to the vehicle body 2 of the vehicle 1 measured by a relative velocity sensor (not shown). The stroke velocity estimation network 121A is an example of the first neural network.

Figure 12:
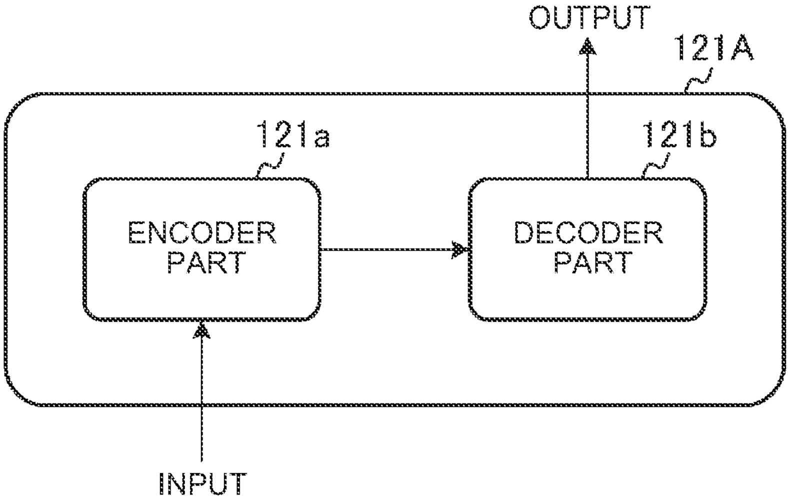
FIG. 12 is an exemplary schematic block diagram showing the configuration of a stroke velocity estimation network according to the second embodiment.

FIG. 12 is an exemplary schematic block diagram showing the configuration of the stroke velocity estimation network 121A according to the second embodiment.

As shown in FIG. 12, the stroke velocity estimation network 121A according to the present embodiment is configured as a sequence to sequence (Seg2Seq) model. More specifically, the stroke velocity estimation network 121A has the same configuration as the vehicle state estimation network 121 of the first embodiment. Namely, the stroke velocity estimation network 121A includes an encoder part 121*a* and a decoder part 121*b*.

Returning back to FIG. 11, the damping control unit 10*c* controls the damping force of the shock absorber 4*b* based on the relative velocity estimated by the stroke velocity estimation unit 10*b*A. Specifically, the damping control unit 10*c* determines a current value to be input to the shock absorber 4*b*, and applies the current value to the shock absorber 4*b*.

Figure 13:
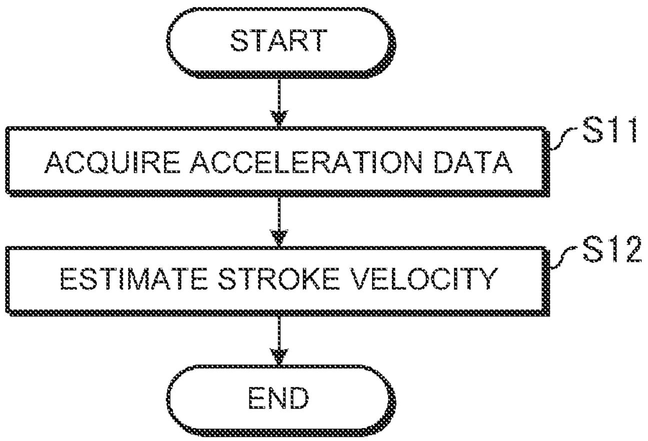
FIG. 13 is a flowchart showing an example of a relative velocity estimation method that is performed by the control device according to the second embodiment.

Next, an example of a relative velocity estimation method that is performed by the control device 10 will be described with reference to FIG. 13. FIG. 13 is a flowchart showing an example of the relative velocity estimation method that is performed by the control device 10 according to the second embodiment. Although FIG. 13 illustrates an example in which acceleration data is used as input data, the input data is not limited to this.

As shown in FIG. 13, the data acquisition unit 10*a* first acquires acceleration data (S11). Next, the stroke velocity estimation unit 10*b*A estimates the stroke velocity that is the relative velocity based on the acceleration data acquired by the data acquisition unit 10*a* and the stroke velocity estimation network 121A (S12).

Figure 14:
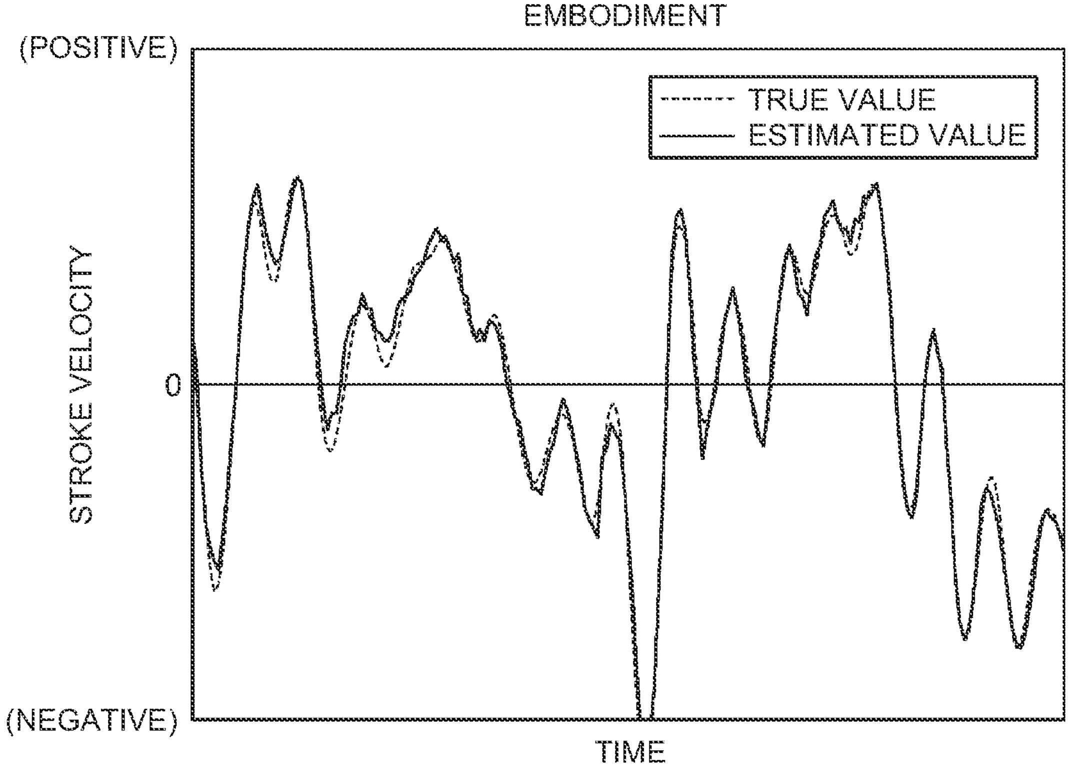
FIG. 14 is an exemplary schematic diagram showing an example of the stroke velocity estimation results obtained by a technique according to the second embodiment.

FIG. 14 is an exemplary schematic diagram showing an example of the stroke velocity estimation results obtained by the technique according to the second embodiment. FIG. 14 shows a stroke velocity (estimated value) estimated by the technique of the present embodiment and an actually measured stroke velocity (true value).

Figure 15:
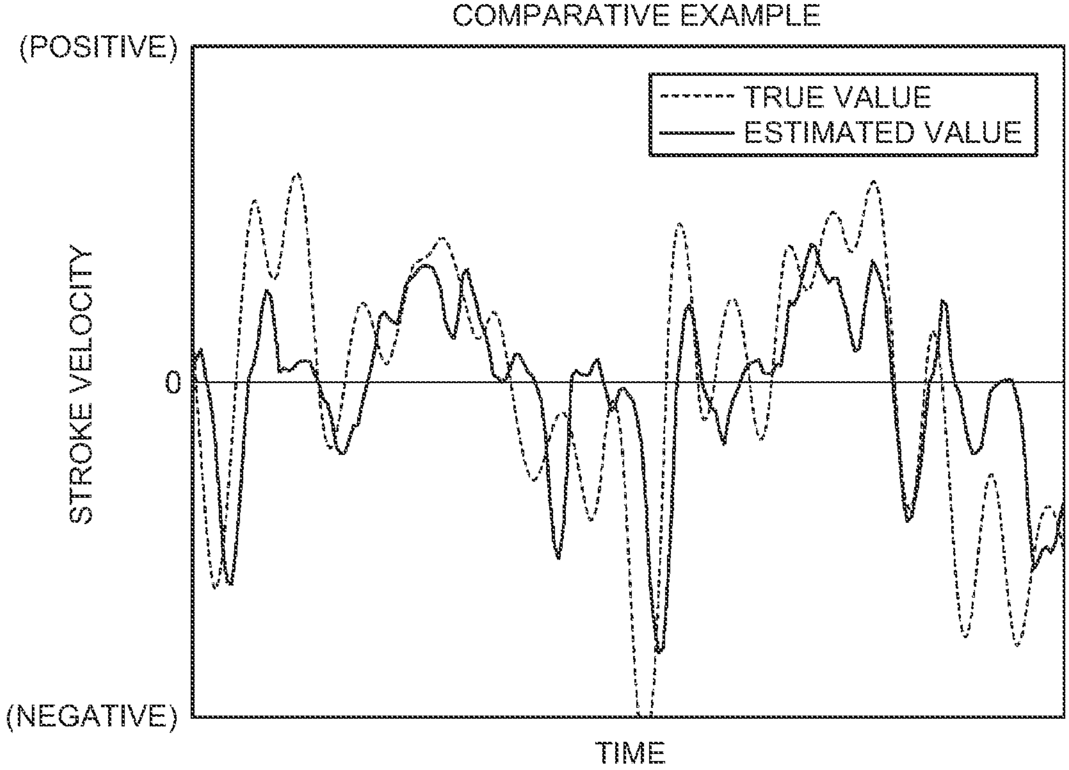
FIG. 15 is an exemplary schematic diagram showing an example of the stroke velocity estimation results obtained by a technique according to a comparative example.

FIG. 15 is an exemplary schematic diagram showing an example of the stroke velocity estimation results obtained by a technique according to a comparative example. FIG. 15 shows a stroke velocity (estimated value) estimated by the technique of the comparative example and an actually measured stroke velocity (true value). The technique of the comparative example estimates the stroke velocity based on a created equation of motion. As can be seen from FIGS. 14 and 15, the technique of the present embodiment has a smaller error between the estimated stroke velocity and the actually measured stroke velocity than the technique of the comparative example.

Figure 16:
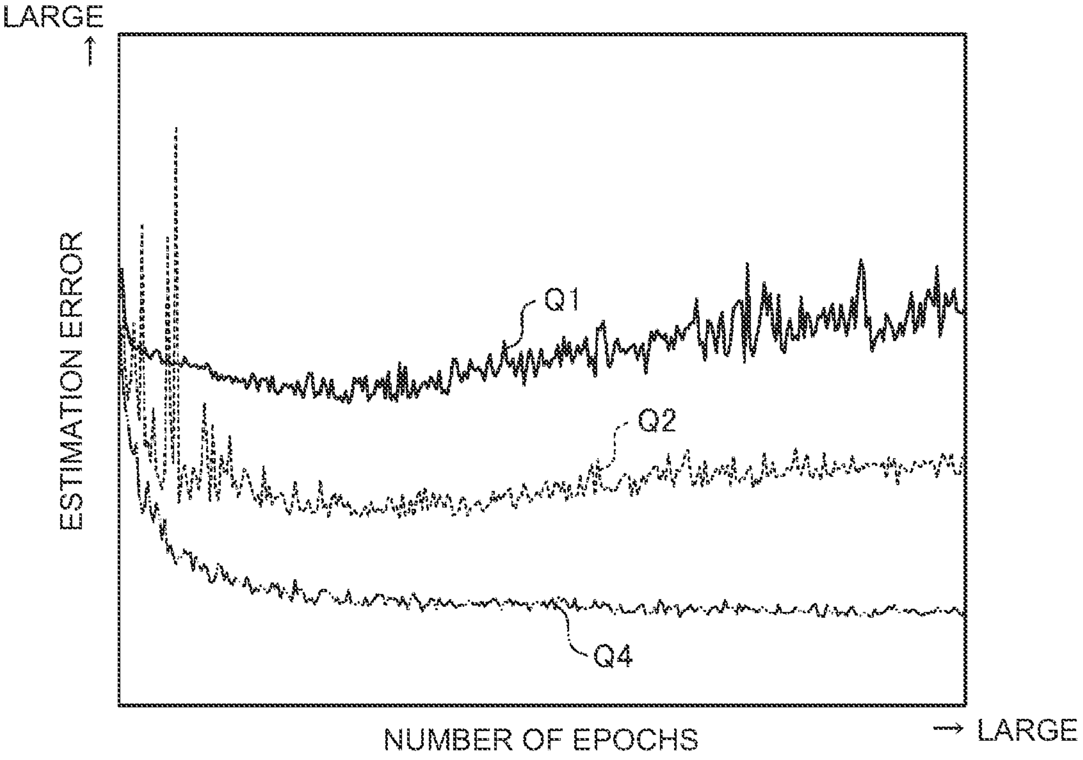
FIG. 16 is an exemplary schematic diagram showing an example of an estimation error of the stroke velocity by the technique according to the second embodiment.

FIG. 16 is an exemplary schematic diagram showing an example of an estimation error of the stroke velocity by the technique according to the second embodiment. The abscissa in FIG. 16 represents the number of epochs, and the ordinate in FIG. 16 represents the estimation error from the true value of the relative velocity. Line Q1 in FIG. 16 indicates an estimation error when an acceleration in the vertical direction corresponding to one tire-wheel assembly 3 is input. Line Q2 in FIG. 16 indicates an estimation error when accelerations in the vertical direction corresponding to the four tire-wheel assemblies 3 are input. Line Q4 in FIG. 16 indicates an estimation error when accelerations in the vertical direction corresponding to the four tire-wheel assemblies 3 and accelerations in the front-rear direction and the right-left direction corresponding to one tire-wheel assembly 3 are input. The accelerations in the example of FIG. 16 are merely an example, and the accelerations that are input are not limited to these.

Figure 17:
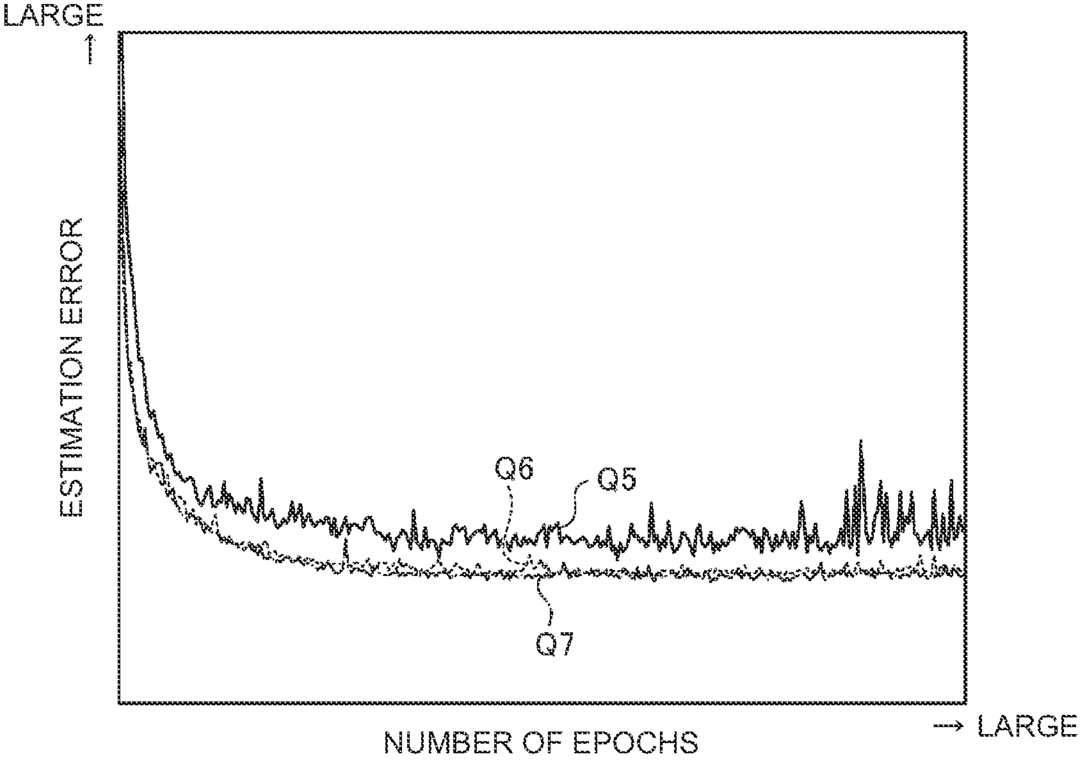
FIG. 17 is an exemplary schematic diagram showing an example of an estimation error of the stroke velocity by the technique according to the second embodiment.

FIG. 17 is an exemplary schematic diagram showing an example of an estimation error of the stroke velocity by the technique according to the second embodiment. FIG. 17 shows an estimation error of the stroke velocity corresponding to one tire-wheel assembly (for example, a front tire-wheel assembly). The abscissa in FIG. 17 represents the number of epochs, and the ordinate in FIG. 17 represents the estimation error from the true value of the relative velocity. Line Q5 in FIG. 17 indicates an estimation error when an acceleration in the vertical direction corresponding to one tire-wheel assembly 3 is input. Line Q6 in FIG. 17 indicates an estimation error when an acceleration in the vertical direction corresponding to one tire-wheel assembly 3 and a current value that is applied to the shock absorber 4*b* of the one tire-wheel assembly 3 are input. Line Q7 in FIG. 17 indicates an estimation error when accelerations in the vertical direction corresponding to the four tire-wheel assemblies 3 and current values that are applied to the shock absorbers 4*b* of the four tire-wheel assemblies 3 are input. The accelerations in the example of FIG. 17 are merely an example, and the accelerations that are input are not limited to these.

The control device 10 (damping control unit 10*c*) of the present embodiment controls the shock absorber 4*b* as follows. That is, the control device 10 controls the damping force of the shock absorber 4*b* based on the relative velocity estimated using the stroke velocity estimation network 121A. More specifically, the control device 10 integrates the acceleration data from the acceleration sensor 6 to calculate the velocity of the vehicle body 2 (hereinafter also referred to as sprung mass velocity). Next, a target damping force is obtained by performing known ride comfort control such as skyhook control based on the velocity of the vehicle body 2. The control device 10 then calculates a target damping coefficient of the shock absorber 4*b* based on the relative velocity estimated using the stroke velocity estimation network 121A and the target damping force. Thereafter, the control device 10 applies a current corresponding to the target damping coefficient to the shock absorber 4*b*.

As described above, in the present embodiment, the control device 10 (vehicle state quantity estimation device) includes the data acquisition unit 10*a* and the stroke velocity estimation unit 10*b*A (relative velocity estimation unit, vehicle state estimation unit). The data acquisition unit 10*a* acquires acceleration data indicating the acceleration of the vehicle 1. The stroke velocity estimation unit 10*b*A estimates the relative velocity (stroke velocity) according to the acceleration data acquired by the data acquisition unit 10*a* by using the stroke velocity estimation network 121A (first neural network) trained to estimate, according to input of the acceleration data, the relative velocity of the tire-wheel assembly 3 of the vehicle 1 with respect to the vehicle body 2 of the vehicle 1 in the vertical direction of the vehicle 1.

With such a configuration, the stroke velocity estimation unit 10*b*A estimates the relative velocity according to the acceleration data acquired by the data acquisition unit 10*a* by using the stroke velocity estimation network 121A trained to estimate, according to input of the acceleration data, the relative velocity of the tire-wheel assembly 3 of the vehicle 1 with respect to the vehicle body 2 of the vehicle 1 in the vertical direction of the vehicle 1. Therefore, the accuracy of estimation of the relative velocity of the tire-wheel assembly 3 with respect to the vehicle body 2 can be improved.

In the present embodiment, the stroke velocity estimation network 121A is an LSTM.

With such a configuration, the accuracy of estimation of the relative velocity of the tire-wheel assembly 3 with respect to the vehicle body 2 can be improved.

In the present embodiment, the data acquisition unit 10*a* also acquires yaw rate data indicating the yaw rate of the vehicle 1. The stroke velocity estimation network 121A has been trained to estimate the relative velocity according to input of the acceleration data and the yaw rate data. The stroke velocity estimation unit 10*b*A uses the stroke velocity estimation network 121A to estimate the relative velocity according to the acceleration data and the yaw rate data both acquired by the data acquisition unit 10*a*.

With such a configuration, the accuracy of estimation of the relative velocity of the tire-wheel assembly 3 with respect to the vehicle body 2 can further be improved.

In the present embodiment, the vehicle 1 includes the shock absorbers 4*b* that are interposed between the vehicle body 2 and the tire-wheel assemblies 3 and that can change the damping force according to the input current. The data acquisition unit 10*a* acquires current value data indicating values of currents. The stroke velocity estimation network 121A has been trained to estimate the relative velocity according to input of the acceleration data and the current value data. The stroke velocity estimation unit 10*b*A uses the stroke velocity estimation network 121A to estimate the relative velocity according to the acceleration data and the current value data both acquired by the data acquisition unit 10*a*.

With such a configuration, the accuracy of estimation of the relative velocity of the tire-wheel assembly 3 with respect to the vehicle body 2 can further be improved.

In the present embodiment, the data acquisition unit 10*a* also acquires steering angle data indicating the steering angle of the vehicle 1. The stroke velocity estimation network 121A has been trained to estimate the relative velocity according to input of the acceleration data and the steering angle data. The stroke velocity estimation unit 10*b*A uses the stroke velocity estimation network 121A to estimate the relative velocity according to the acceleration data and the steering angle data both acquired by the data acquisition unit 10*a*.

With such a configuration, the accuracy of estimation of the relative velocity of the tire-wheel assembly 3 with respect to the vehicle body 2 can further be improved.

In the present embodiment, the data acquisition unit 10*a* also acquires wheel speed data indicating the rotational speed of the tire-wheel assembly 3. The stroke velocity estimation network 121A has been trained to estimate the relative velocity according to input of the acceleration data and the wheel speed data. The stroke velocity estimation unit 10*b*A uses the stroke velocity estimation network 121A to estimate the relative velocity according to the acceleration data and the wheel speed data both acquired by the data acquisition unit 10*a*.

With such a configuration, the accuracy of estimation of the relative velocity of the tire-wheel assembly 3 with respect to the vehicle body 2 can further be improved.

The above embodiment illustrates an example in which one acceleration sensor 6 is provided for each of the four tire-wheel assemblies 3. However, the number of acceleration sensors 6 and the mounting positions thereof are not limited to this. For example, the acceleration sensor 6 may be mounted on only three tire-wheel assemblies other than a predetermined one tire-wheel assembly (e.g., the left rear tire-wheel assembly 3R) out of the four tire-wheel assemblies 3. In this case, for example, it may be assumed that the vehicle body 2 is a rigid body, and the acceleration of the one tire-wheel assembly for which the acceleration sensor 6 is not provided may be geometrically estimated from the output values of the acceleration sensors 6 provided for the three tire-wheel assemblies. The acceleration sensor 6 is preferably mounted directly above the tire-wheel assembly 3 (at a position directly above the wheel). However, even when the acceleration sensor 6 is mounted at a position slightly away from directly above the tire-wheel assembly 3, the acceleration directly above the tire-wheel assembly 3 may be similarly estimated from the output value of the acceleration sensor 6.

Third Embodiment

Figure 18:
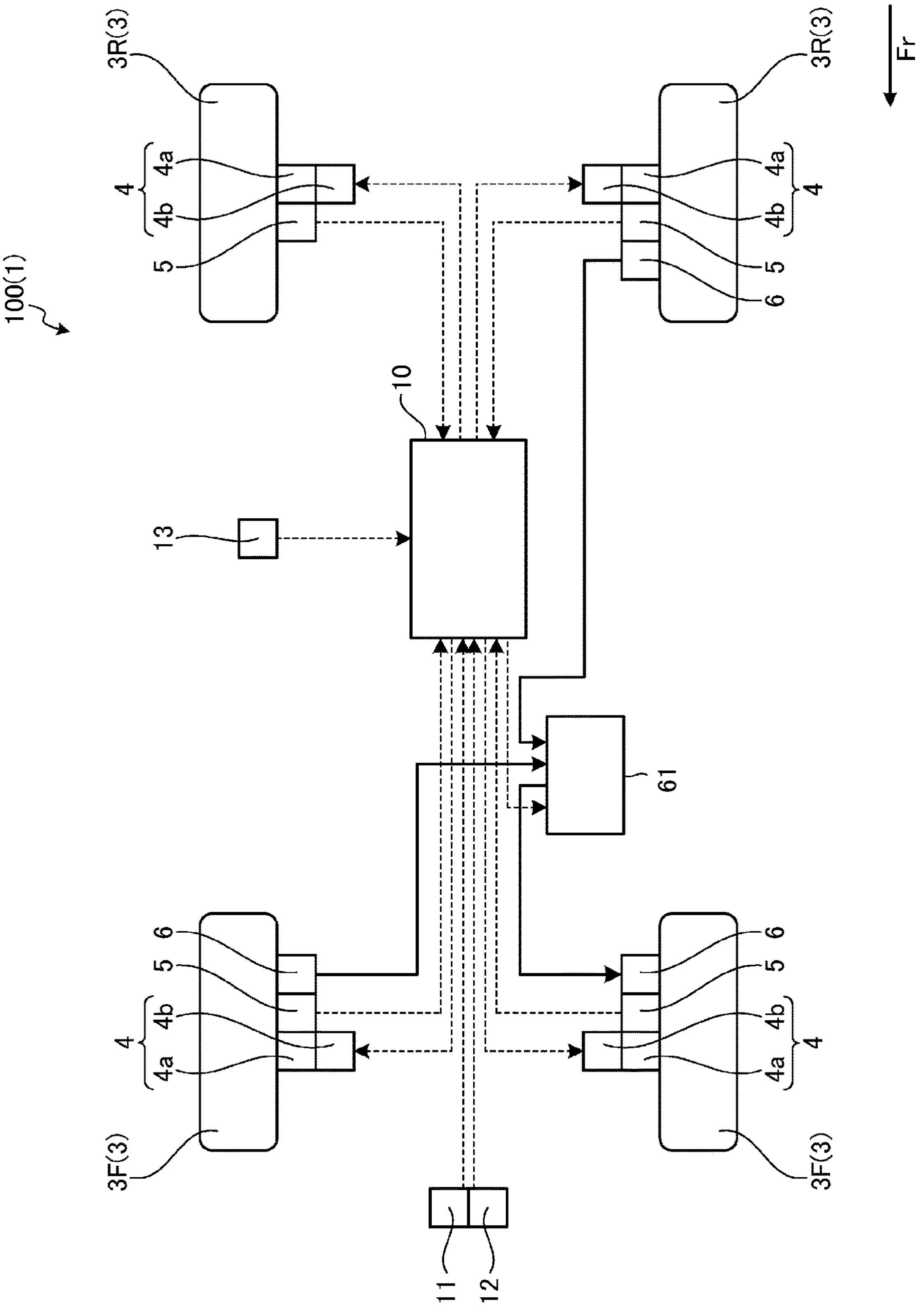
FIG. 18 is a schematic diagram showing a schematic configuration of an example of a vehicle according to a third embodiment.

FIG. 18 is a schematic diagram showing a schematic configuration of an example of the vehicle 1 according to a third embodiment. The present embodiment is different from the second embodiment in the number of acceleration sensors 6 and in the process that is performed by the control device 10.

As shown in FIG. 18, the acceleration sensors 6 are provided for only three of the four tire-wheel assemblies 3. As an example, the acceleration sensor 6 are provided for the two right and left front tire-wheel assemblies 3F and the left rear tire-wheel assembly 3L. That is, the acceleration sensor 6 is not provided for the right rear tire-wheel assembly 3R. That is, in the present embodiment, the acceleration sensors 6 are provided only at three acceleration detection target points out of the four acceleration detection target points located directly above each tire-wheel assembly 3 (at positions directly above each wheel) in the vehicle body 2. The acceleration sensor 6 detects an actual acceleration that is an actual acceleration at the acceleration detection target point. The acceleration of the vehicle body is also called sprung mass acceleration. That is, the acceleration sensor 6 detects the sprung mass acceleration.

Figure 19:
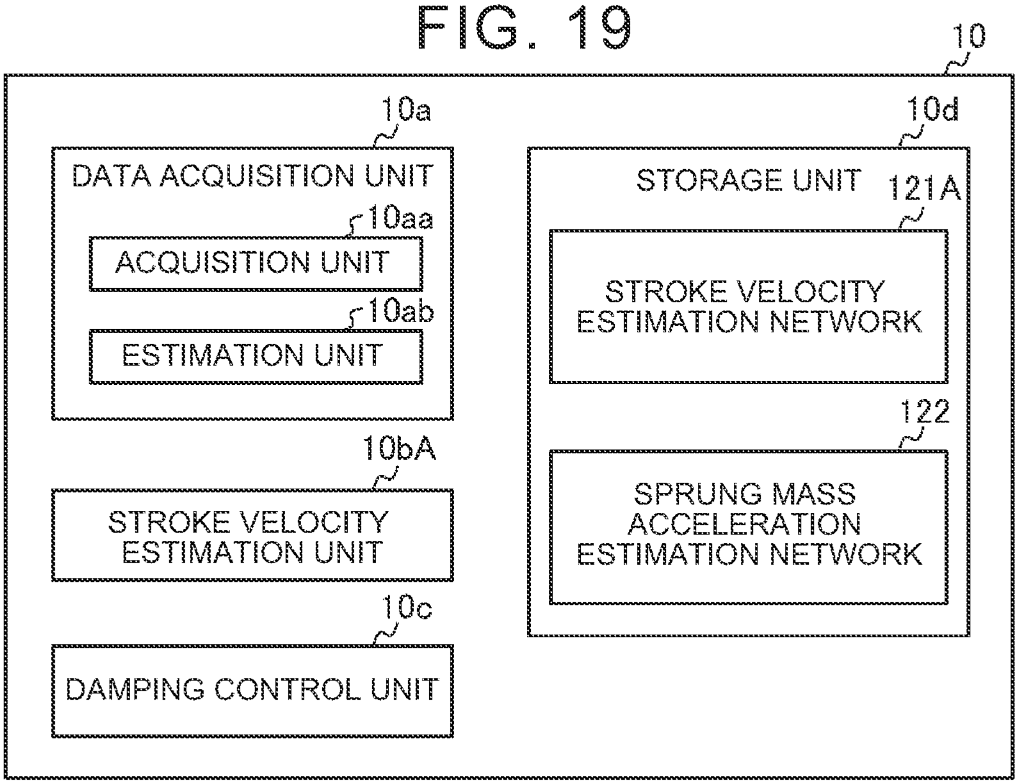
FIG. 19 is a functional block diagram of a control device of the example of the vehicle according to the third embodiment.

FIG. 19 is a functional block diagram of the control device 10 of the example of the vehicle 1 according to the third embodiment. As shown in FIG. 19, the data acquisition unit 10*a* has an acquisition unit 10*aa* and an estimation unit 10*ab*.

The acquisition unit 10*aa* acquires actual acceleration data indicating the actual acceleration at the acceleration detection target point from each acceleration sensor 6.

The actual acceleration data for the three acceleration detection target points from the acceleration sensors 6 acquired by the acquisition unit 10*aa* is input to the estimation unit 10*ab*. The estimation unit 10*ab* estimates actual accelerations at all (for example, four) acceleration detection target points according to input of the actual acceleration data for the three acceleration detection target points by using a sprung mass acceleration estimation network 122 (second neural network).

As shown in FIG. 19, the storage unit 10*d* stores the sprung mass acceleration estimation network 122 in addition to the stroke velocity estimation network 121A.

Figure 20:
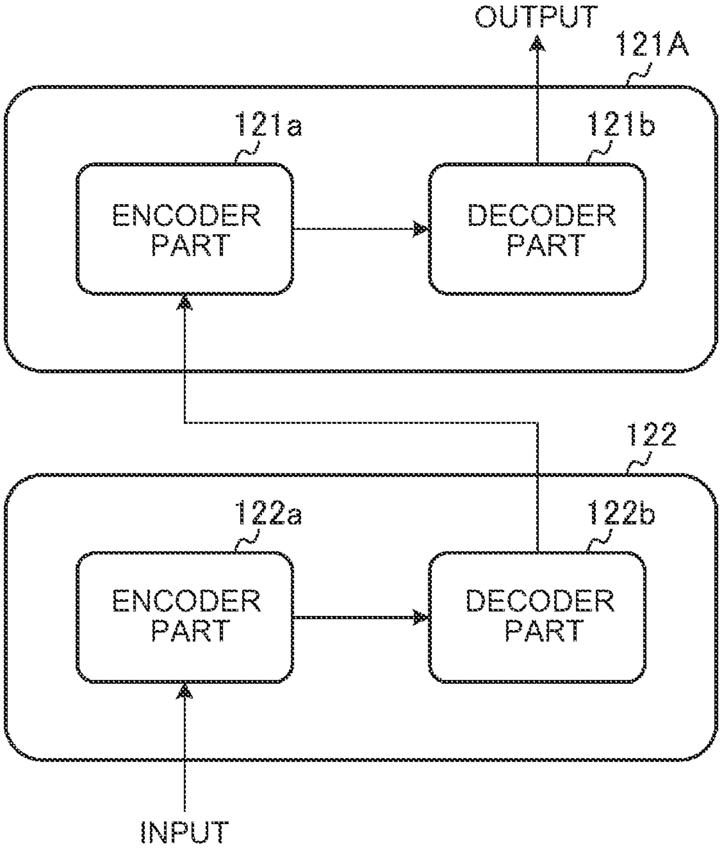
FIG. 20 is an exemplary schematic block diagram showing the configurations of a stroke velocity estimation network and a sprung mass acceleration estimation network according to the third embodiment.

FIG. 20 is an exemplary schematic block diagram showing the configurations of the stroke velocity estimation network 121A and the sprung mass acceleration estimation network 122 according to the third embodiment.

The sprung mass acceleration estimation network 122 is configured as a recurrent neural network (RNN) trained in advance to estimate actual acceleration data (output) for all (for example, four) acceleration detection target points according to input of the actual acceleration data (input data) for a part of (for example, three) acceleration detection target points out of a plurality of acceleration detection target points. For the training of the stroke velocity estimation network 121A, the input data is the actual acceleration data for a part of (for example, three) acceleration detection target points out of the plurality of acceleration detection target points. For the training, the output data as training data is actual accelerations at the acceleration detection target points detected by each acceleration sensor 6 in the case where the acceleration sensors 6 are provided at all of the plurality of acceleration detection target points. Mounting of each acceleration sensor 6 on the vehicle body 2 may be different between the vehicle 1 for training of the stroke vehicle estimation network 121A (for example, a test vehicle for training) and the vehicle 1 in which the sprung mass acceleration estimation network 122 is actually used (for example, a production vehicle). For example, each acceleration sensor 6 may be more firmly attached to the vehicle body 2 in the vehicle 1 for training of the stroke vehicle estimation network 121A than in the vehicle 1 in which the sprung mass acceleration estimation network 122 is actually used. This can be implemented by, for example, using relatively rigid brackets etc. to attach the acceleration sensors 6 to the vehicle body 2. This reduces vibration of the acceleration sensors 6 during training, so that the accuracy of acceleration detection can further be improved. The sprung mass acceleration estimation network 122 is an example of the neural network and the second neural network.

Like the stroke velocity estimation network 121A, the sprung mass acceleration estimation network 122 is configured as a Seg2Seq model. More specifically, like the stroke velocity estimation network 121A, the sprung mass acceleration estimation network 122 includes an encoder part 121*a* that receives input of input data and performs encoding, and a decoder part 121*b* that performs decoding based on the encoder results from the encoder part 121*a* and outputs the decoded data.

The acceleration data estimated by the data acquisition unit 10*a* is input to the stroke velocity estimation unit 10*b*A. The stroke velocity estimation unit 10*b*A receives the acceleration data acquired by the data acquisition unit 10*a* as input data, and estimates the stroke velocity that is the relative velocity by the stroke velocity estimation network 121A.

Figure 21:
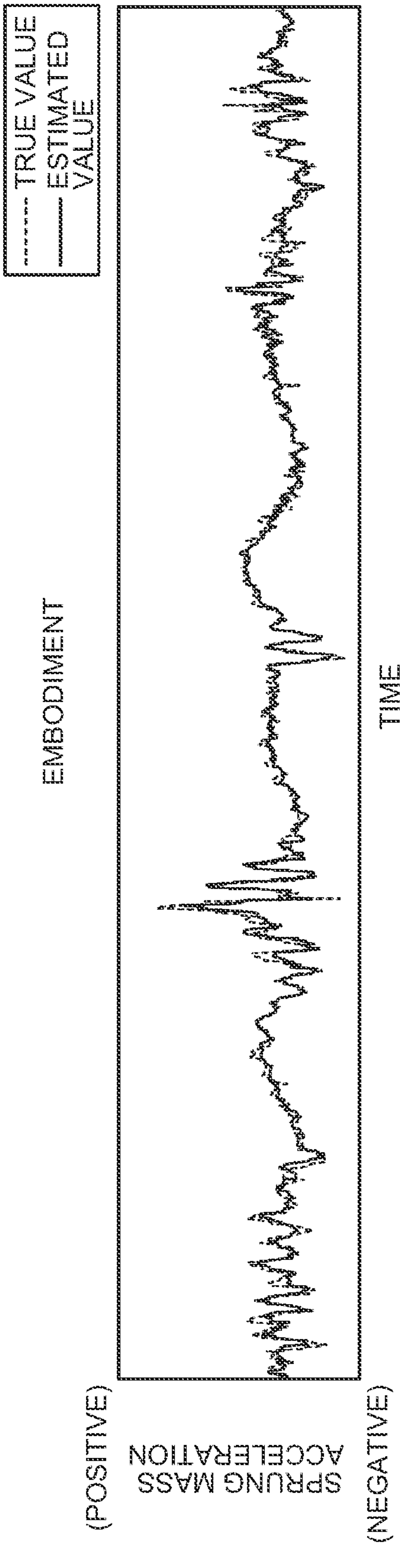
FIG. 21 is an exemplary schematic diagram showing an example of the sprung mass acceleration estimation results obtained by a technique according to the third embodiment.

FIG. 21 is an exemplary schematic diagram showing an example of the sprung mass acceleration estimation results obtained by the technique according to the third embodiment. FIG. 21 shows a sprung mass acceleration (estimated value) estimated by the technique of the third embodiment and an actually measured sprung mass acceleration (true value).

Figure 22:
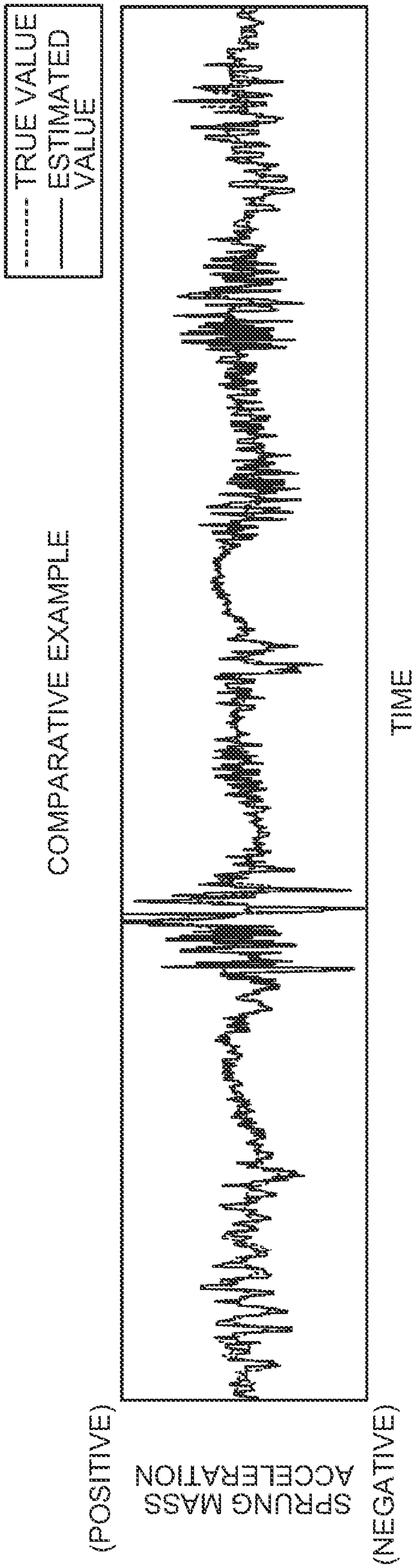
FIG. 22 is an exemplary schematic diagram showing an example of the sprung mass acceleration estimation results obtained by a technique according to a comparative example.

FIG. 22 is an exemplary schematic diagram showing an example of the sprung mass acceleration estimation results obtained by a technique according to a comparative example. FIG. 22 shows a sprung mass acceleration (estimated value) estimated by the technique of the comparative example and an actually measured sprung mass acceleration (true value). The technique of the comparative example is an example in which an acceleration at an acceleration detection target point where the acceleration sensor 6 is not provided is geometrically obtained from accelerations at acceleration detection target points where the acceleration sensor 6 is provided. As can be seen from FIGS. 21 and 22, the technique of the present embodiment has a smaller error between the estimated sprung mass acceleration and the actually measured sprung mass acceleration than the technique of the comparative example.

As described above, in the present embodiment, the data acquisition unit 10*a* has the acquisition unit 10*aa* and the estimation unit 10*ab*. The acquisition unit 10*aa* acquires actual acceleration data indicating actual accelerations at the acceleration detection target points from the acceleration sensors 6 provided at only a part of the plurality of acceleration detection target points located at different positions from each other in the vehicle 1. The estimation unit 10*ab* estimates actual accelerations at all of the plurality of acceleration detection target points according to input of the actual acceleration data by using the sprung mass acceleration estimation network 122 (second neural network) trained to estimate, according to input of the actual acceleration data, actual accelerations at the acceleration detection target points that are detected by each acceleration sensor when the acceleration sensor is provided at all of the plurality of acceleration detection target points.

With such a configuration, the estimation unit 10*ab* uses the sprung mass acceleration estimation network 122 to estimate actual accelerations at all of the plurality of acceleration detection target points including the point where the acceleration sensor 6 is not provided. Therefore, the accuracy of acceleration data can be improved. Accordingly, the accuracy of estimation of the relative velocity of the tire-wheel assembly 3 with respect to the vehicle body 2 can further be improved.

The estimation unit 10*ab* may use the sprung mass acceleration estimation network 122 to estimate only an actual acceleration at the acceleration detection target point where the acceleration sensor 6 is not provided out of the plurality of acceleration detection target points. The estimation unit 10*ab* may use the sprung mass acceleration estimation network 122 to estimate at least an actual acceleration at the acceleration detection target point where the acceleration sensor 6 is not provided out of the plurality of acceleration detection target points. In these cases, the actual accelerations at those acceleration detection target points for which an actual acceleration is not estimated by the estimation unit 10*ab* may be acquired by the acquisition unit 10*aa* from the acceleration sensors 6 and input to the stroke velocity estimation unit 10*b*A.

Although the embodiments and modifications are described in the present disclosure, these are presented by way of example only, and are not intended to limit the scope of the invention. These novel embodiments can be carried out in various other forms, and various omissions, replacements, and modifications can be made without departing from the scope of the disclosure. These embodiments and modifications thereof are included in the scope and gist of the invention, and are included in the invention described in the claims and the scope equivalent thereto.

DESCRIPTION OF THE REFERENCE NUMERALS

1 . . . Vehicle
2 . . . Vehicle Body
3 . . . Tire-Wheel Assembly
4*b* . . . Shock Absorber
10 . . . Control Device (Vehicle State Quantity Estimation Device)
10*a* . . . Data Acquisition Unit
10*aa* . . . Acquisition Unit
10*ab* . . . Estimation Unit
10*b* . . . Vehicle State Estimation Unit
10*b*A . . . Stroke Velocity Estimation Unit (Relative Velocity Estimation Unit)
121 . . . Vehicle State Estimation Network (First Neural Network)
121A . . . Stroke Velocity Estimation Network (First Neural Network)
122 . . . Sprung Mass Acceleration Estimation Network (Neural Network, Second Neural Network)

The invention claimed is:

1. A vehicle state quantity estimation device, comprising:

a data acquisition unit that acquires first data that is data about a velocity of a vehicle;

a vehicle state estimation unit that estimates either or both of a relative velocity and a vehicle body velocity according to the first data acquired by the data acquisition unit by using a first neural network trained to estimate either or both of the relative velocity and the vehicle body velocity according to input of the first data, the relative velocity being a relative velocity of a tire-wheel assembly of the vehicle with respect to a vehicle body of the vehicle in a vertical direction of the vehicle, and the vehicle body velocity being a velocity of the vehicle body in the vertical direction; and a shock absorber actuator configured to control damping based on the estimated relative velocity or vehicle body velocity, wherein the first data is wheel speed data indicating a rotational speed of the tire-wheel assembly and a value of a current, the vehicle includes a shock absorber interposed between the vehicle body and the tire-wheel assembly and capable of changing a damping force according to an input current, the data acquisition unit acquires current value data of the input current indicating the value of the current, the first neural network has been trained to estimate either or both of the relative velocity and the vehicle body velocity according to input of the wheel speed data and the current value data, and the vehicle state estimation unit uses the first neural network to estimate either or both of the relative velocity and the vehicle body velocity according to the wheel speed data and the current value data both acquired by the data acquisition unit.

2. A vehicle state quantity estimation device, comprising:

a data acquisition unit that acquires first data that is data about a velocity of a vehicle;

a vehicle state estimation unit that estimates either or both of a relative velocity and a vehicle body velocity according to the first data acquired by the data acquisition unit by using a first neural network trained to estimate either or both of the relative velocity and the vehicle body velocity according to input of the first data, the relative velocity being a relative velocity of a tire-wheel assembly of the vehicle with respect to a vehicle body of the vehicle in a vertical direction of the vehicle, and the vehicle body velocity being a velocity of the vehicle body in the vertical direction; and a shock absorber actuator configured to control damping based on the estimated relative velocity or vehicle body velocity, wherein the first data includes acceleration data indicating an acceleration of the vehicle and a value of a current, the vehicle includes a shock absorber interposed between the vehicle body and the tire-wheel assembly and capable of changing a damping force according to an input current, the data acquisition unit acquires current value data of the input current indicating the value of the current, the first neural network has been trained to estimate the relative velocity according to input of the acceleration data and the current value data, and the vehicle state estimation unit uses the first neural network to estimate the relative velocity according to the acceleration data and the current value data both acquired by the data acquisition unit.

3. The vehicle state quantity estimation device according to claim 1, wherein the first neural network is a long short term memory (LSTM).

4. A vehicle state quantity estimation device, comprising:

a data acquisition unit that acquires first data that is data about a velocity of a vehicle; and a vehicle state estimation unit that estimates either or both of a relative velocity and a vehicle body velocity according to the first data acquired by the data acquisition unit by using a first neural network trained to estimate either or both of the relative velocity and the vehicle body velocity according to input of the first data, the relative velocity being a relative velocity of a tire-wheel assembly of the vehicle with respect to a vehicle body of the vehicle in a vertical direction of the vehicle, and the vehicle body velocity being a velocity of the vehicle body in the vertical direction, wherein the data acquisition unit includes an acquisition unit that acquires, from an acceleration sensor provided at only a part of a plurality of acceleration detection target points located at different positions from each other in the vehicle, actual acceleration data indicating an actual acceleration that is an actual acceleration at the acceleration detection target point, and an estimation unit that estimates the actual accelerations at all of the plurality of acceleration detection target points according to input of the actual acceleration data by using a second neural network trained to estimate, according to input of the actual acceleration data, the actual acceleration at the acceleration detection target point detected by each of the acceleration sensors when the acceleration sensor is provided at all of the plurality of acceleration detection target points.

5. A vehicle state quantity estimation device, comprising:

an acquisition unit that acquires, from an acceleration sensor provided at only a part of a plurality of acceleration detection target points located at different positions from each other in a vehicle, actual acceleration data indicating an actual acceleration that is an actual acceleration at the acceleration detection target point; and an estimation unit that estimates the actual accelerations at all of the plurality of acceleration detection target points according to input of the actual acceleration data by using a neural network trained to estimate, according to input of the actual acceleration data, the actual acceleration at the acceleration detection target point detected by each of the acceleration sensors when the acceleration sensor is provided at all of the plurality of acceleration detection target points.

* * * * *